US011790629B2

(12) United States Patent
De Moor et al.

(10) Patent No.: US 11,790,629 B2
(45) Date of Patent: *Oct. 17, 2023

(54) INTENSITY NORMALIZATION IN IMAGING MASS SPECTROMETRY

(71) Applicant: KATHOLIEKE UNIVERSITEIT LEUVEN, Leuven (BE)

(72) Inventors: Bart De Moor, Bierbeek (BE); Raf Van De Plas, Delft (NL); Etienne Waelkens, Rotselaar (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 1022 days.

This patent is subject to a terminal disclaimer.

(21) Appl. No.: 16/380,489

(22) Filed: Apr. 10, 2019

(65) Prior Publication Data

US 2019/0236397 A1    Aug. 1, 2019

Related U.S. Application Data

(63) Continuation of application No. 13/640,367, filed as application No. PCT/BE2011/000022 on Apr. 12, 2011, now Pat. No. 10,268,916.

(30) Foreign Application Priority Data

Apr. 12, 2010  (GB) .................................... 1005959

(51) Int. Cl.
| | |
|---|---|
| G01N 33/48 | (2006.01) |
| G01N 33/50 | (2006.01) |
| G06V 10/28 | (2022.01) |
| G06V 10/30 | (2022.01) |
| H01J 49/00 | (2006.01) |

(52) U.S. Cl.
CPC .............. *G06V 10/28* (2022.01); *G06V 10/30* (2022.01); *H01J 49/0004* (2013.01)

(58) Field of Classification Search
CPC ...... G06V 10/28; G06V 10/30; H01J 49/0004
See application file for complete search history.

(56) References Cited

U.S. PATENT DOCUMENTS

| 10,268,916 B2 * | 4/2019 | De Moor ................ G06V 10/28 |
| 2003/0009293 A1 * | 1/2003 | Anderson ................ G16B 50/30 |
| | | 702/19 |
| 2003/0073903 A1 | 4/2003 | Sato |
| 2003/0111596 A1 | 6/2003 | Becker et al. |
| 2005/0244973 A1 * | 11/2005 | Andel, III ........ G01N 33/57434 |
| | | 436/64 |
| 2008/0173807 A1 * | 7/2008 | Yoon ................... H01J 49/0045 |
| | | 250/282 |
| 2009/0294647 A1 | 12/2009 | Michelmann |

OTHER PUBLICATIONS

Crawford et al. Computer methods in analytical mass spectrometry: identification of an unknown compound in a catalog. Analytical Chemistry, vol. 40, pp. 1464-1469. (Year: 1968).*
Hertz et al. Identification of mass spectra by computer-searching a file of known spectra. Analytical Chemistry, vol. 43, pp. 681-691. (Year: 1971).*
Mass Spectrometer. In M. Clugston, The Penguin dictionary of science (4th ed.). Penguin. Credo Reference: https://search.credoreference.com/content/entry/penguinscience/mass_spectrometer/0?institutionId=743 (Year: 2014).*
Deininger et al., "Normalization in MALDI-TOF Imaging Datasets of Proteins: Practical Considerations," Analytical and Bioanalytical Chemistry, vol. 401, Apr. 12, 2011, pp. 167-181.
Deininger et al., "Practical Considerations on Normalization in MALDI Imaging," Proceedings of the 58th ASMS Conference on Mass Spectrometry, May 22, 2010, 1 Page.
Engelen et al., "Normalization of cDNA Microarrays Using External Control Spikes," Proceedings of the First Benelux Bioinformatics Conference, Apr. 14, 2005, 1 Page.
Lee et al., "Learning the Parts of Objects by Non-Negative Matrix Factorization," Nature, vol. 401, Oct. 1999, pp. 788-791.
McDonnell et al., "Imaging Mass Spectrometry," Mass Spectrometry Reviews, vol. 26, Apr. 30, 2007, pp. 606-643.
Norris et al., "Processing MALDI Mass Spectra to Improve Mass Spectral Direct Tissue Analysis," International Journal of Mass Spectrometry, vol. 260, 2007, pp. 212-221.
Perlin et al., "Toward Fully Automated Genotyping: Genotyping Microsatellite Markers by Deconvolution," American Journal of Human Genetics, vol. 57, 1995, pp. 1199-1210.
Rauser et al., "In-Situ-Proteomanalyse von Geweben: Mittels biidgebender Massenspektrometrie (MALDI Imaging)," Der Pathologe: Organ Der Deutschen Abtei Lung Der Internationalen Akademie Fur Pathologie, Der Deutschen, Der Osterreichischen Uno Der Schweizerischen Gesellschaft Fur Patholog Ie Uno Des Berufsverbandes Deutscher Pathologen, vol. 30, No. 2, Sep. 11, 2009, pp. 140-145.
Siy et al., "Matrix Factorization Techniques for Analysis of Imaging Mass Spectrometry Data," 8th IEEE International Conference on Bioinformatics and Bioengineering, Oct. 8, 2008, 6 Pages.
Sugiura et al., "Two-Step Matrix Application Technique to Improve Ionization Efficiency for Matrix-Assisted Laser Desorption/Ionization in Imaging Mass Spectrometry," Analytical Chemistry, vol. 78, 2006, pp. 8227-8235.
Van De Plas et al., "Prospective Exploration of Biochemical Tissue Composition Via Imaging Mass Spectrometry Guided by Principal Component Analysis." Pacific Symposium on Biocomputing, vol. 12, 2007, pp. 458-469.
European Office Action from EP Application No. 11730870.0, dated Nov. 30, 2017.

* cited by examiner

*Primary Examiner* — Russell S Negin
(74) *Attorney, Agent, or Firm* — WORKMAN NYDEGGER

(57) ABSTRACT

The present invention relates generally to a species (analyte) separation and analysis system, for instance a spectrometry system, comprising a processor for receiving and processing signals from said its detector to remove undesirable variation or noise before further processing into a spectrum, whereby the processor is programmed by a novel program for a normalization preprocessing of the signals of said separation and analysis system.

19 Claims, 17 Drawing Sheets
(17 of 17 Drawing Sheet(s) Filed in Color)

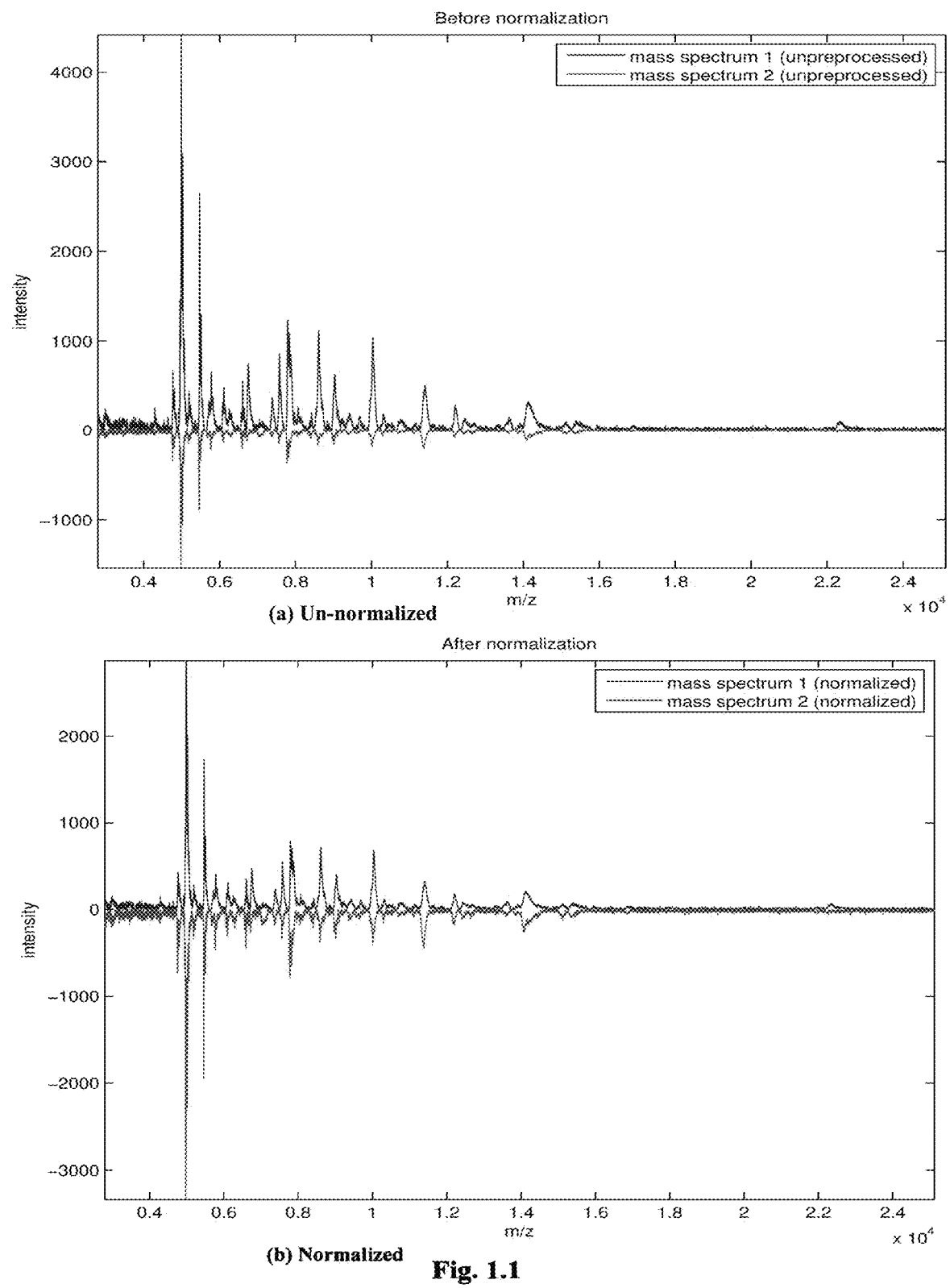
Fig. 1.1

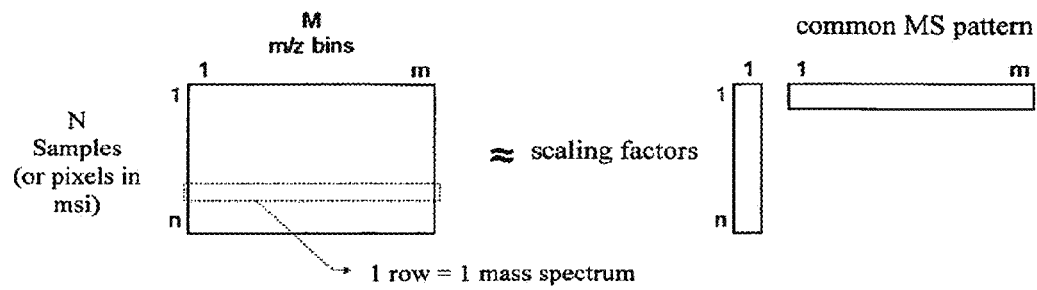
Fig 1.2.
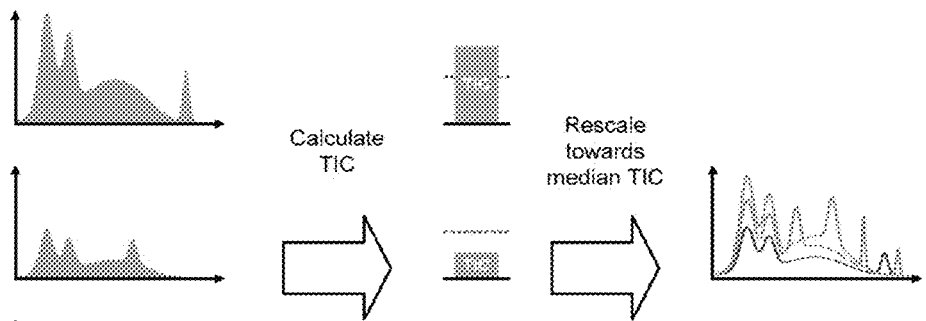
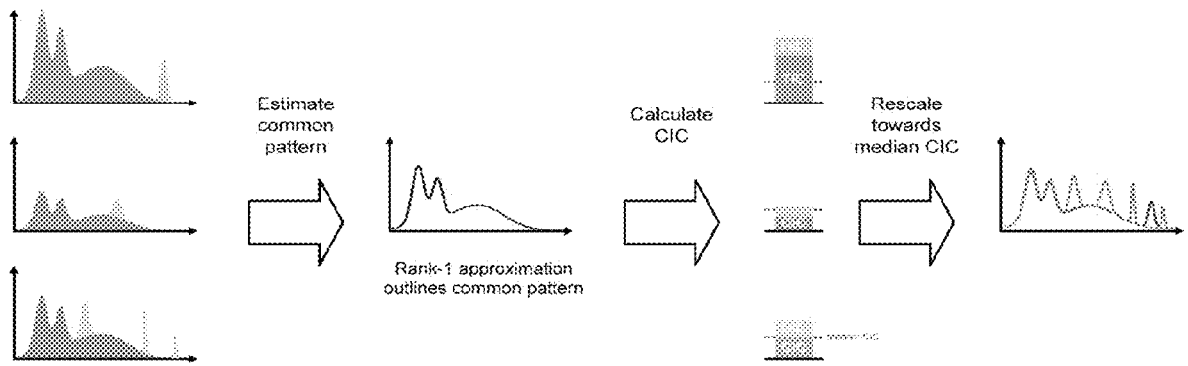
Fig 1.3.

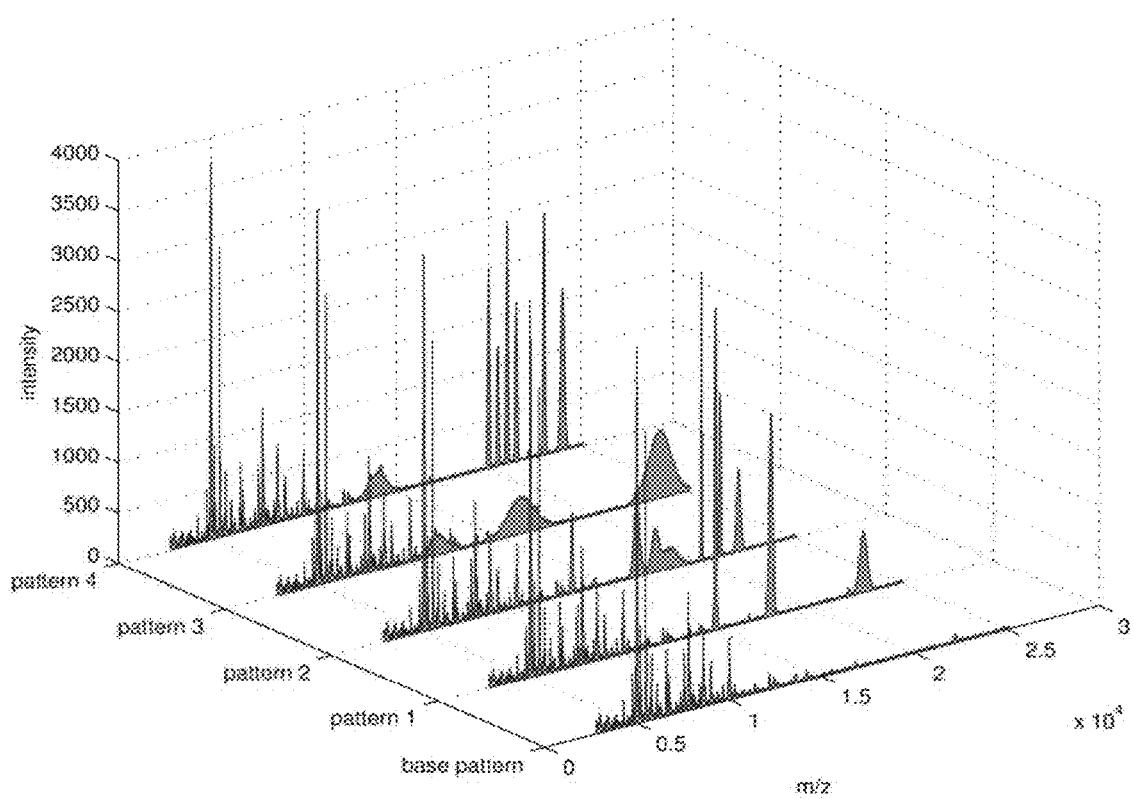
Fig 1.4
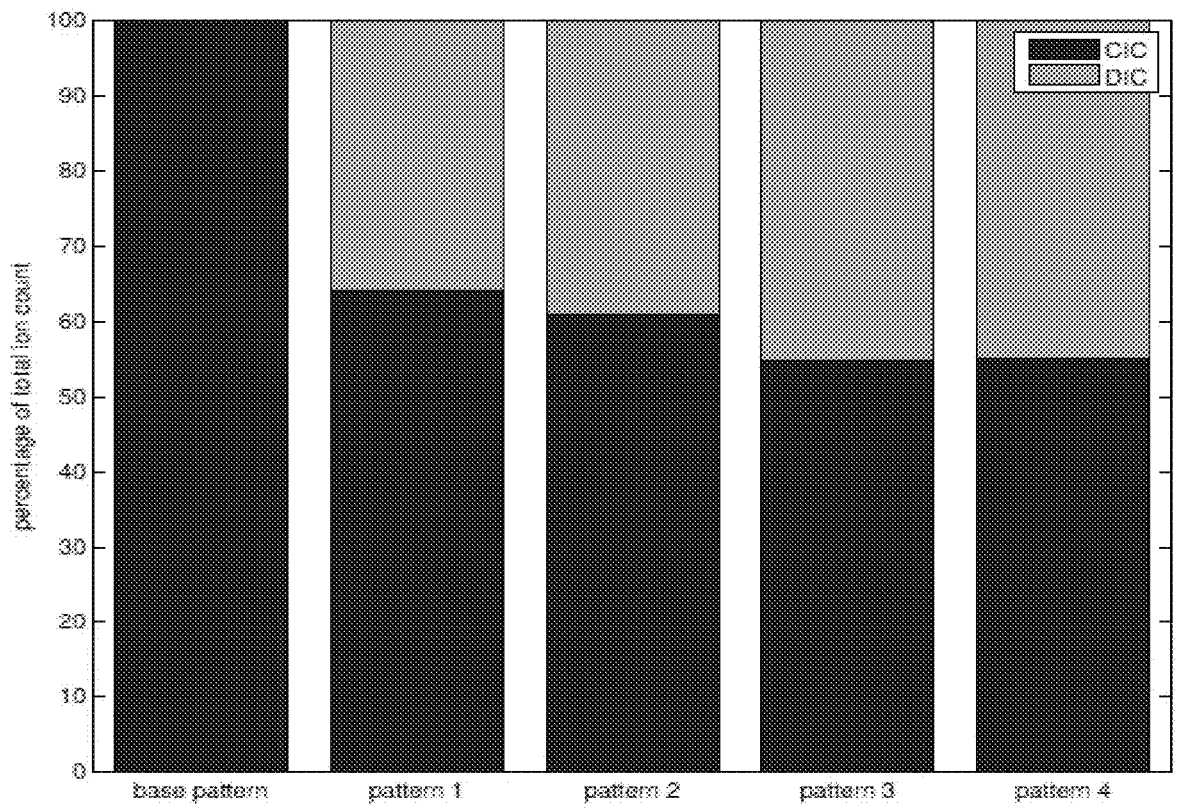
Fig 1.5

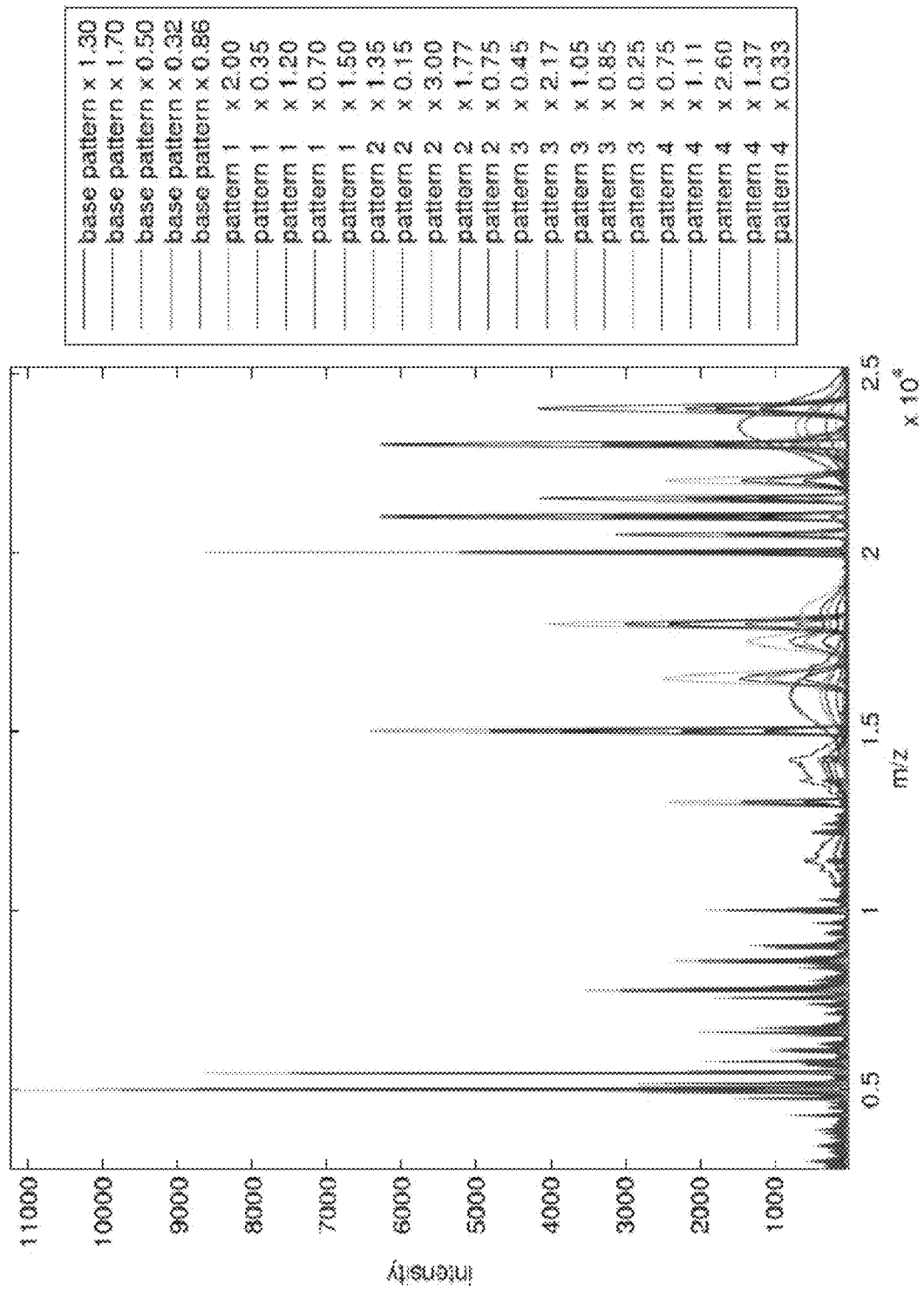
Fig. 1.6.

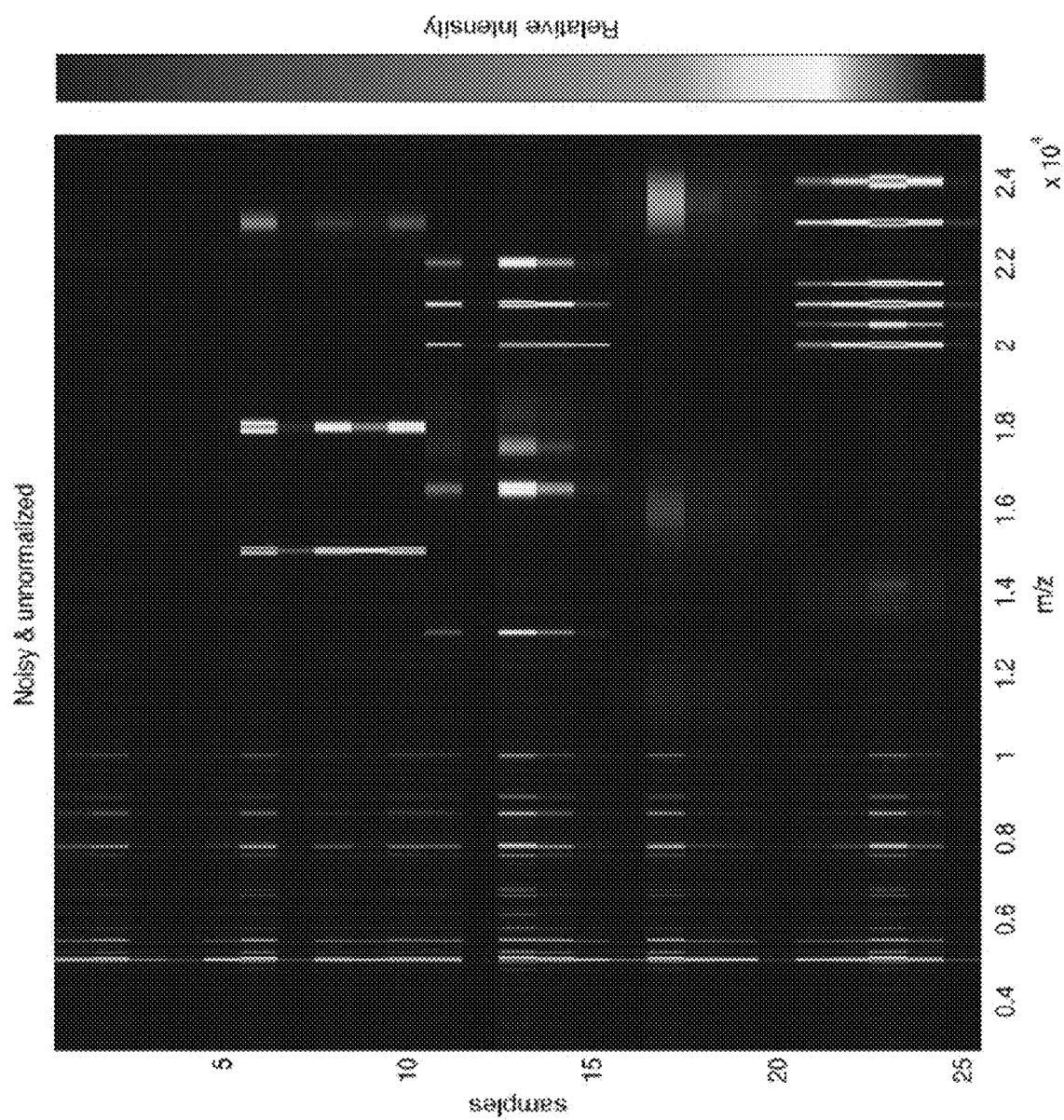
Fig. 1.7.

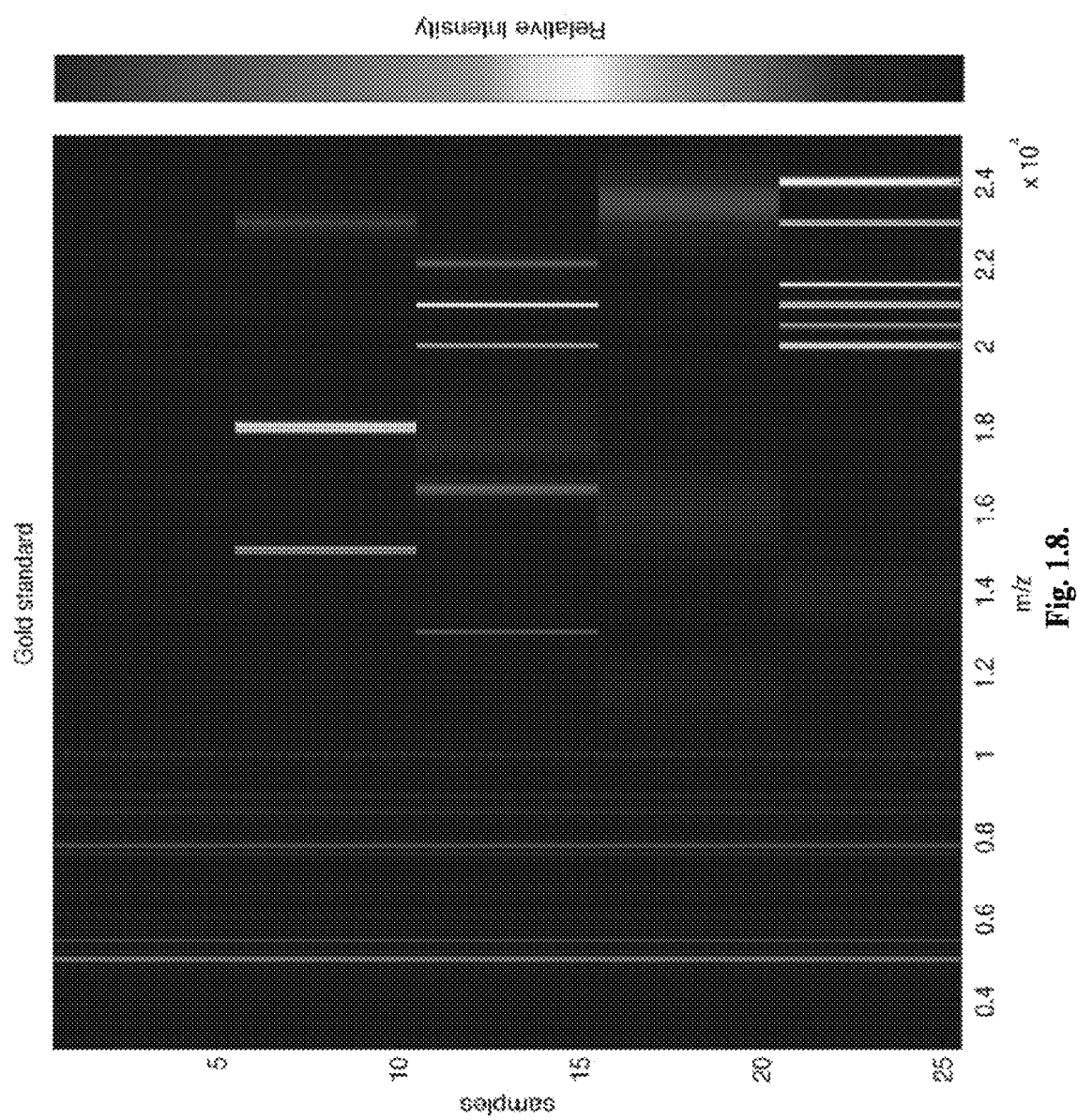
Fig. 1.8.

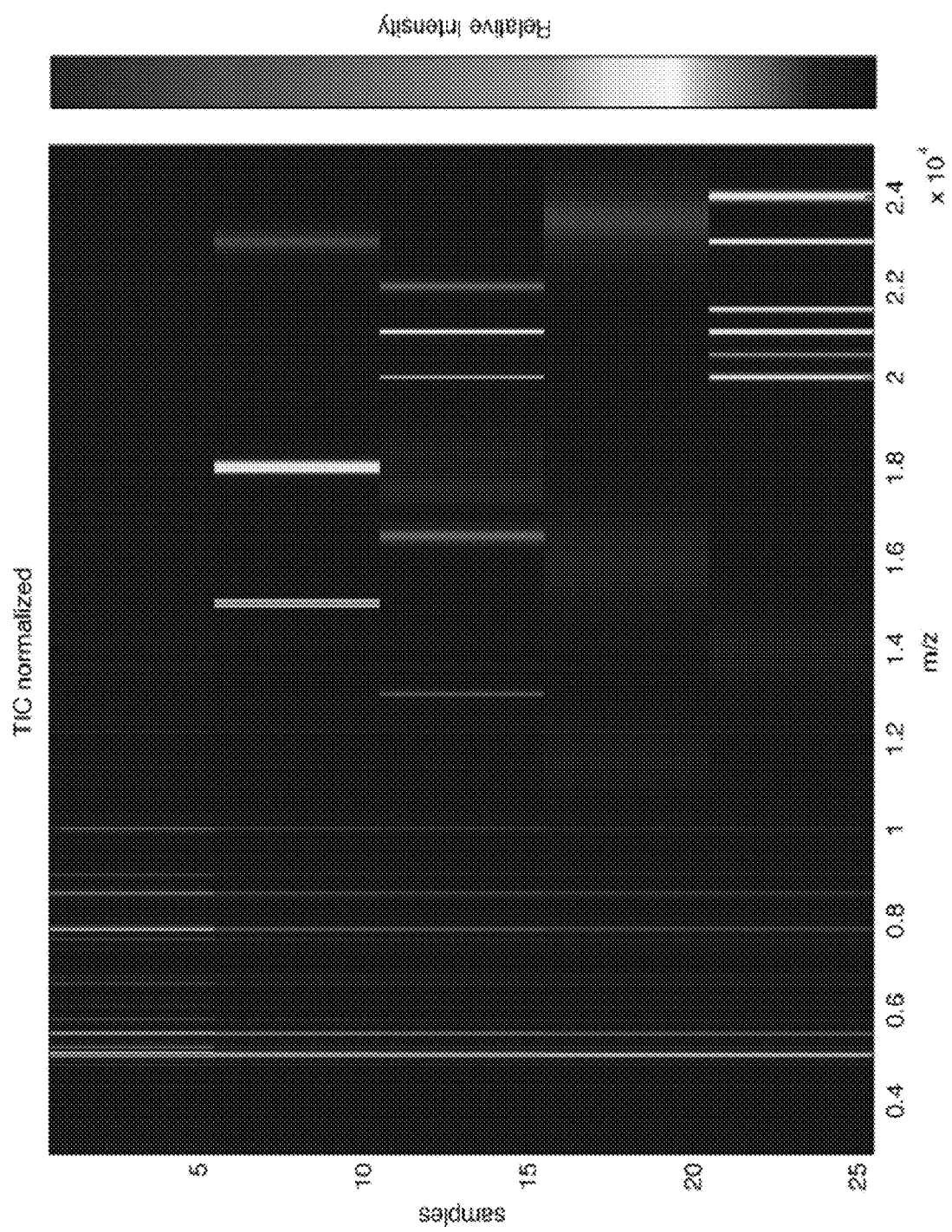
Fig. 1.9.

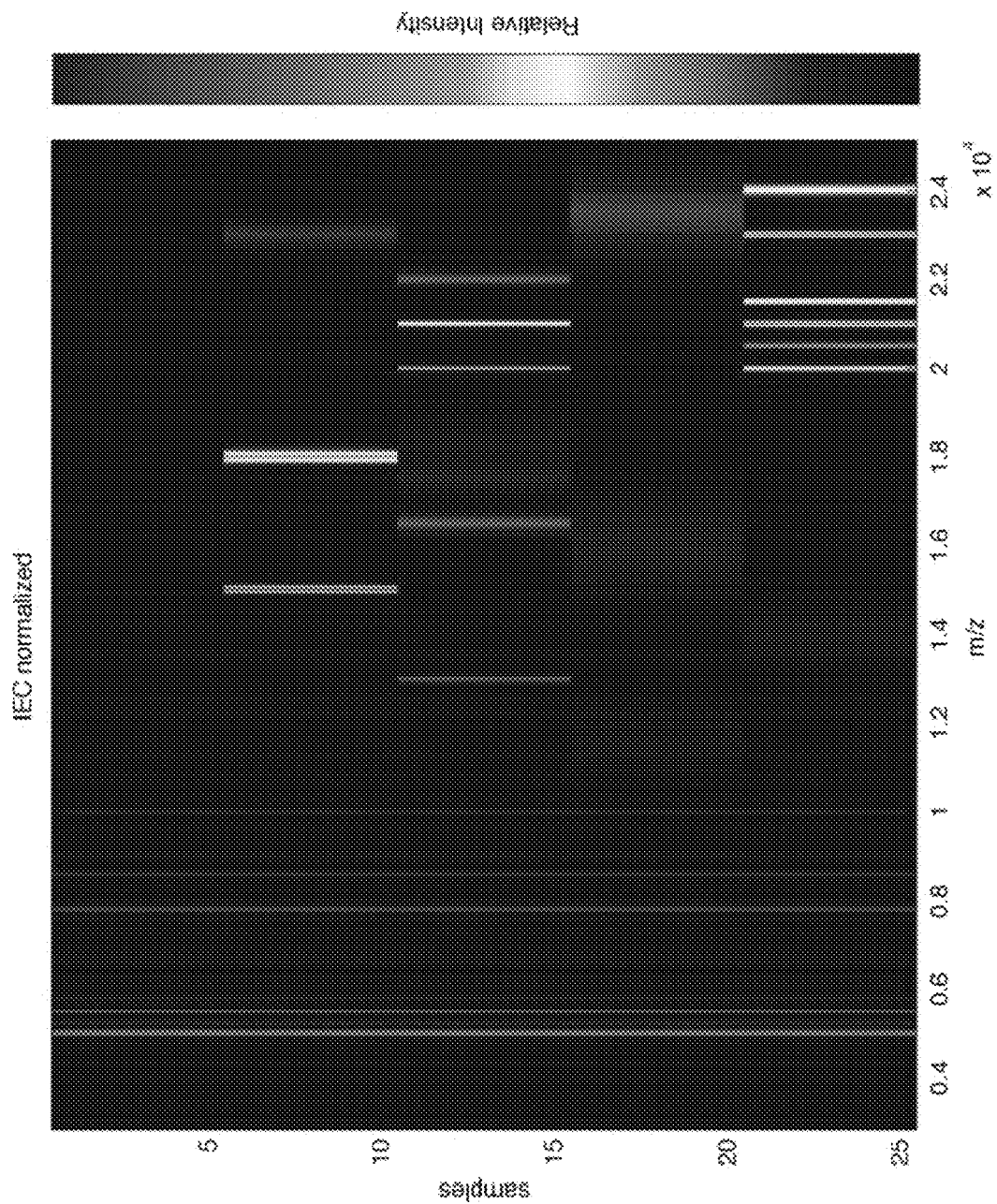
Fig. 1.10.

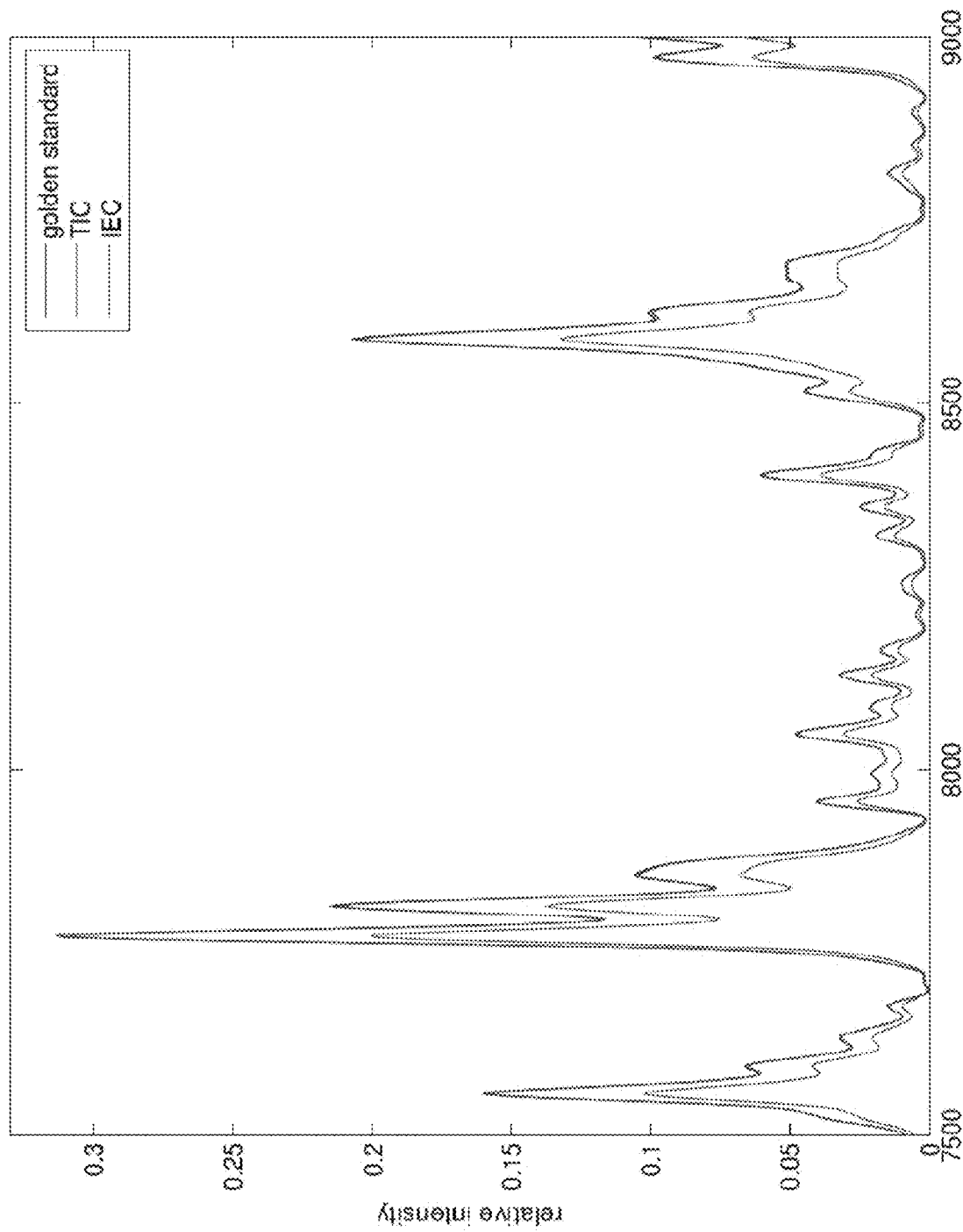
Fig. 1.11.

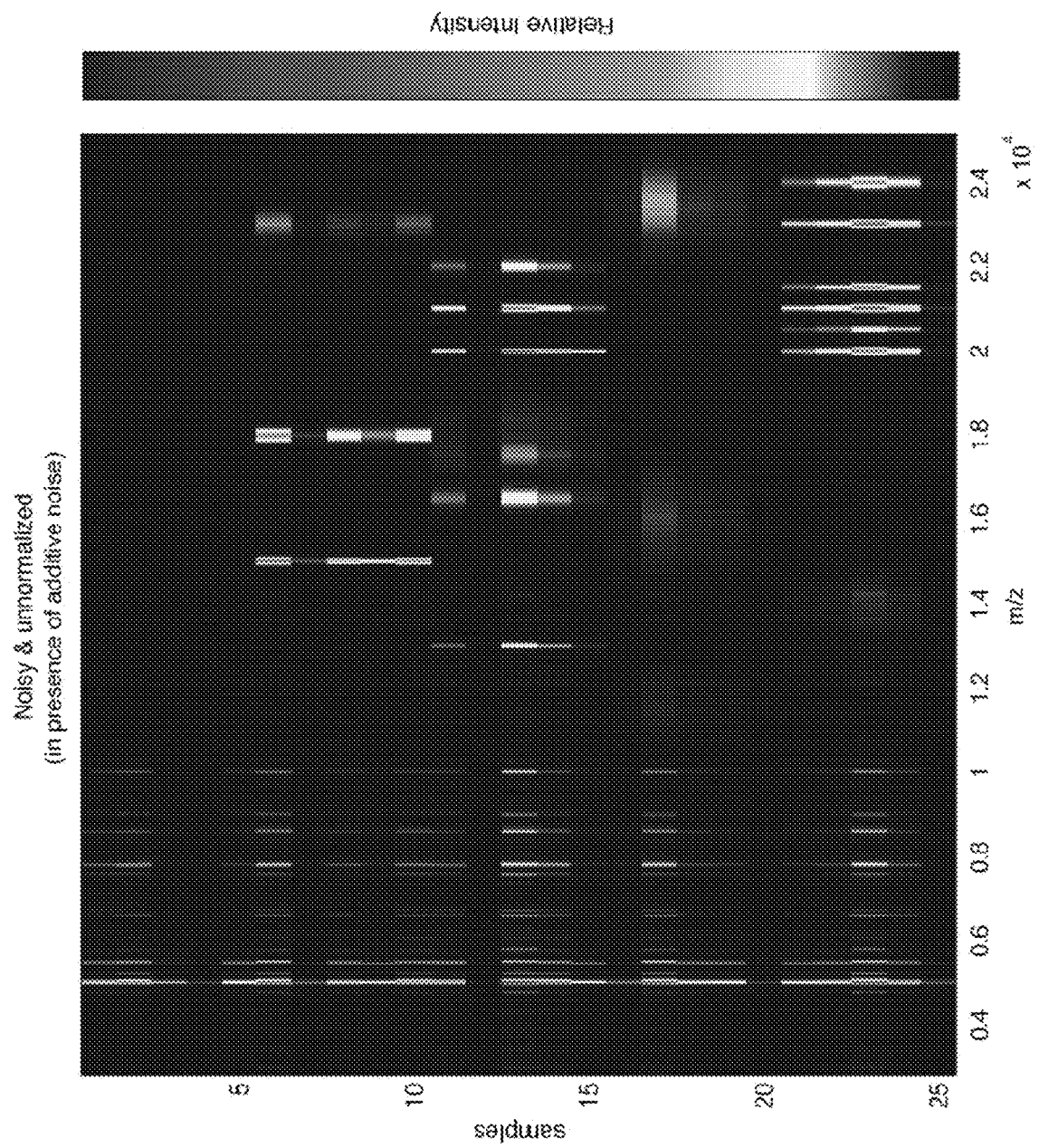
Fig. 1.12.

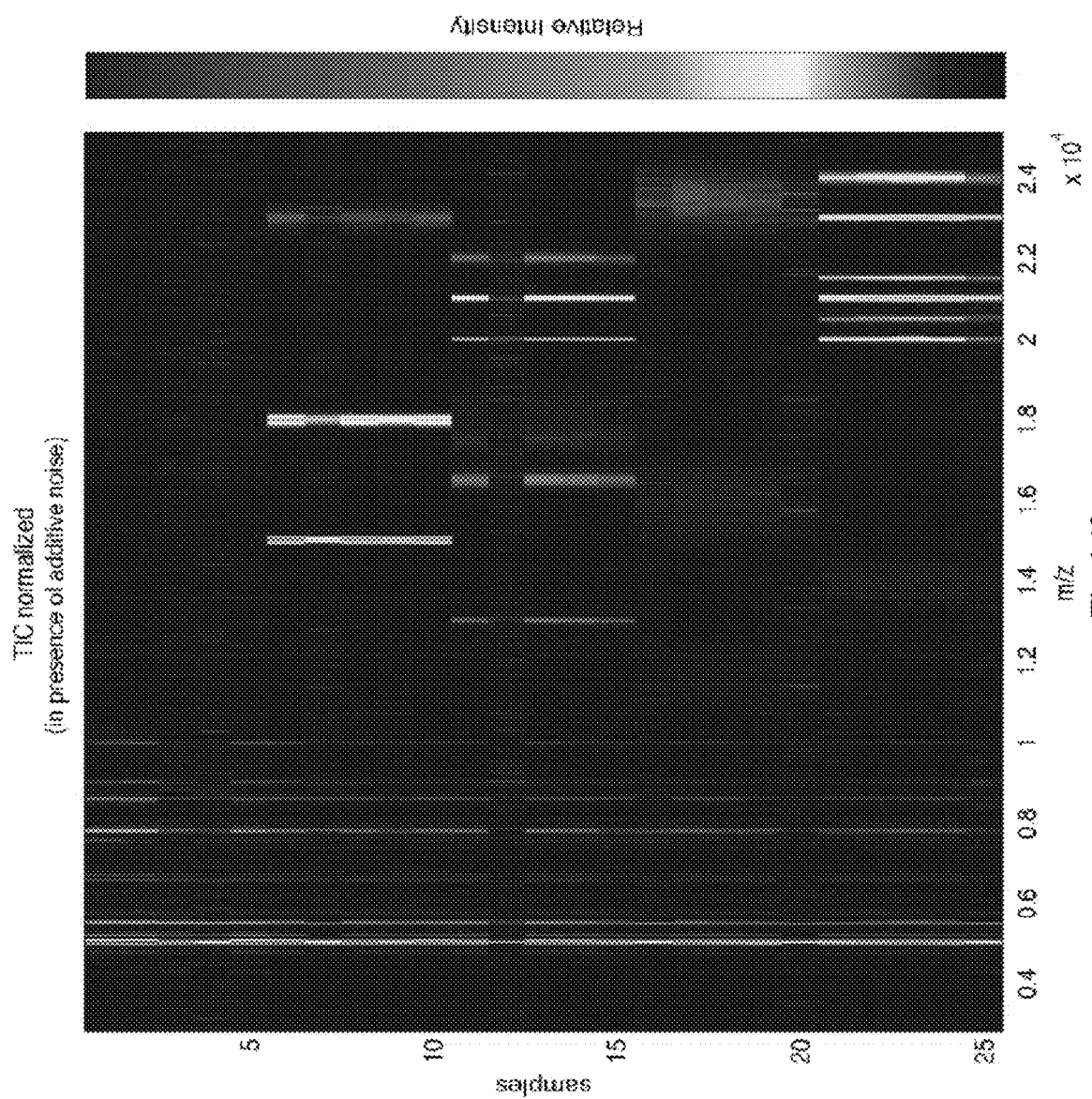
Fig. 1.13.

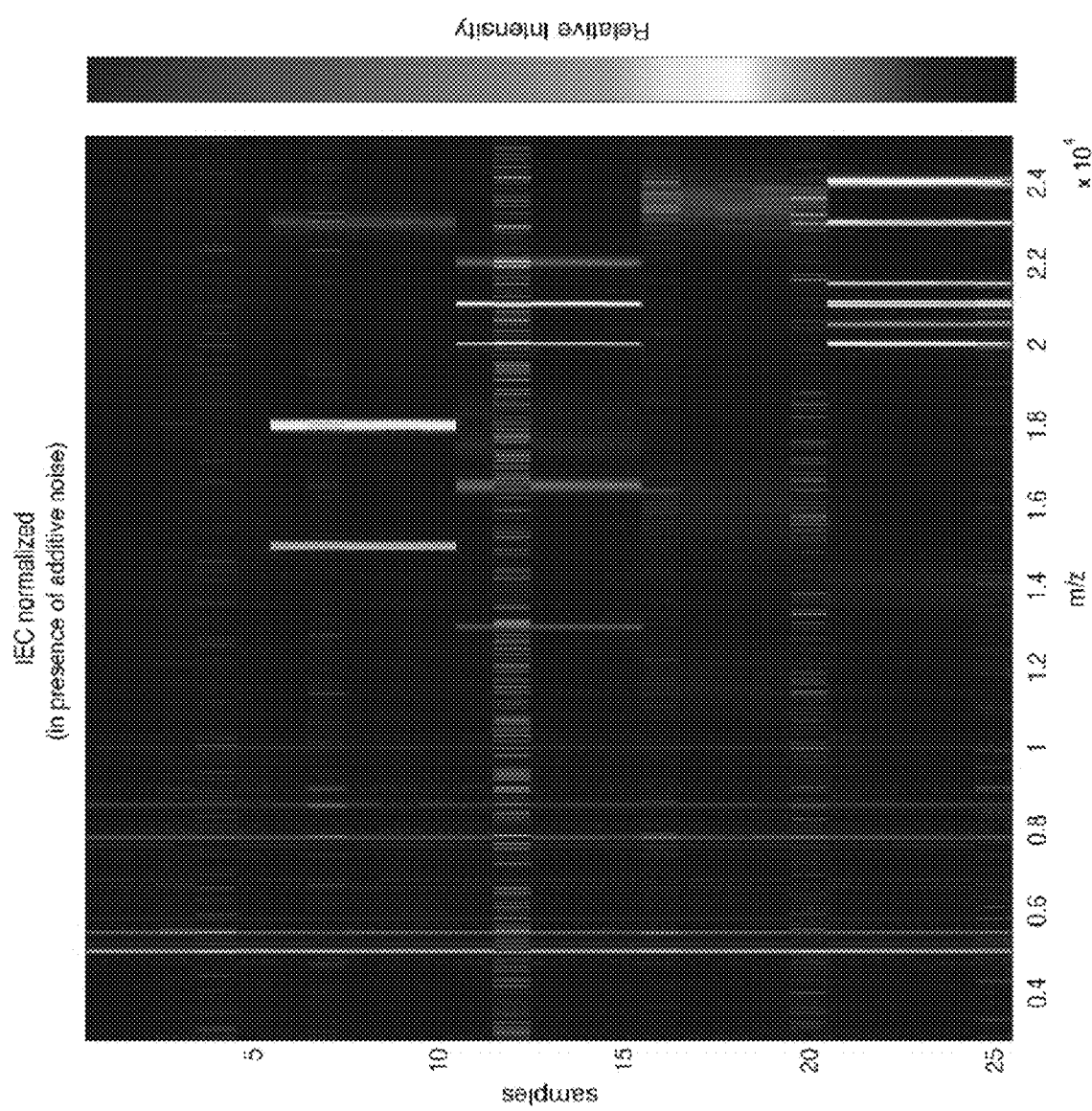
Fig. 1.14.

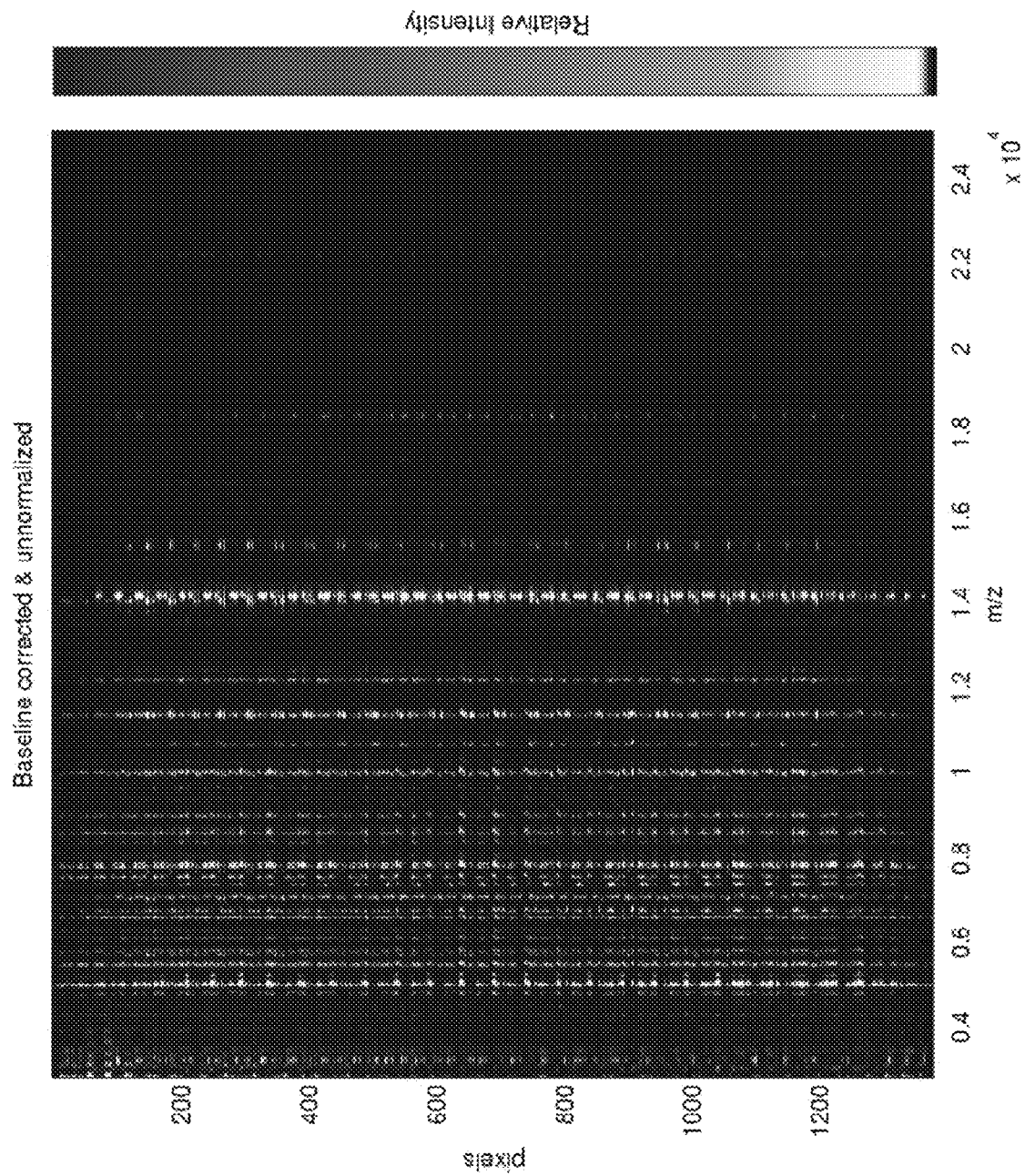
Fig. 1.15

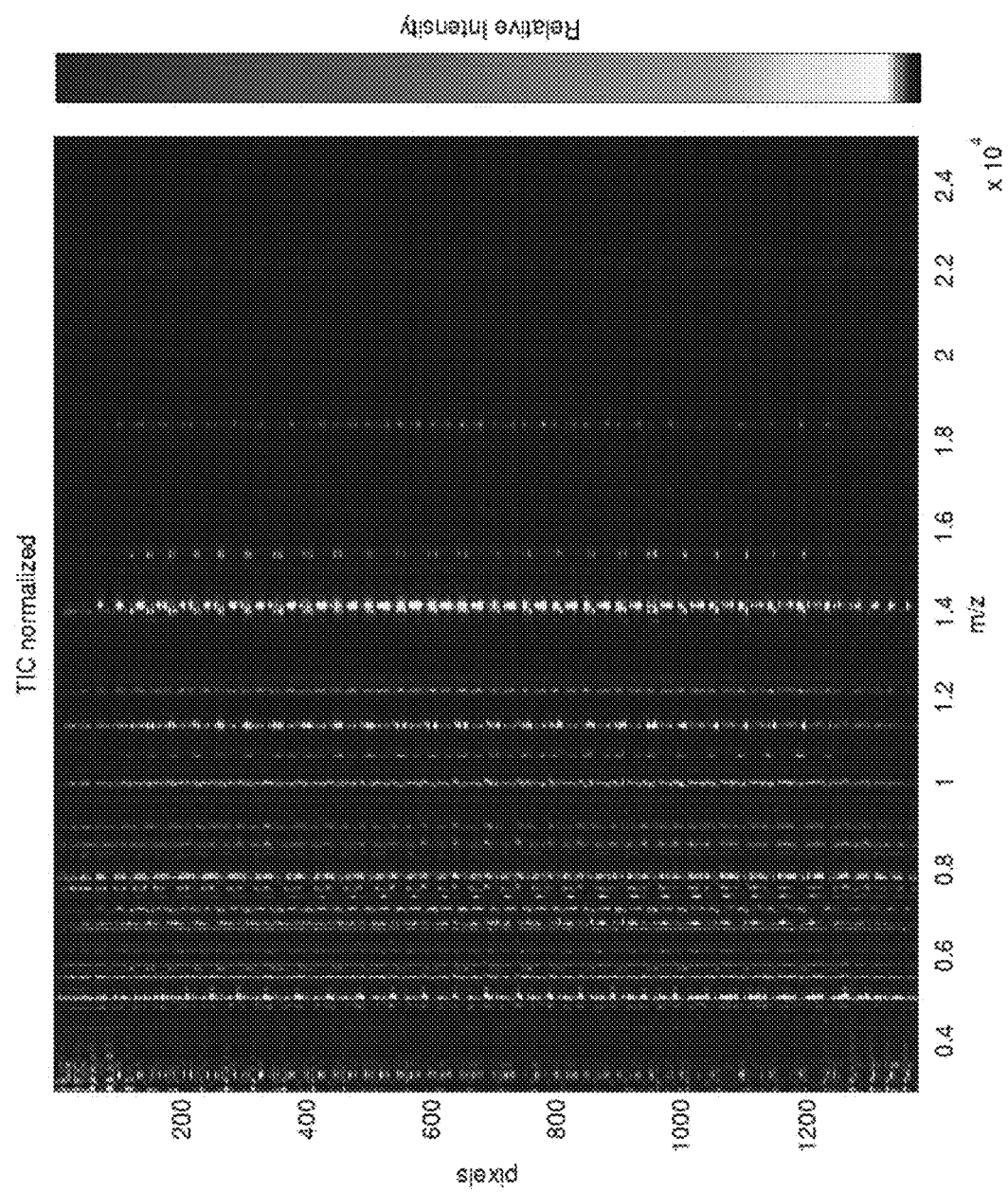
Fig. 1.16

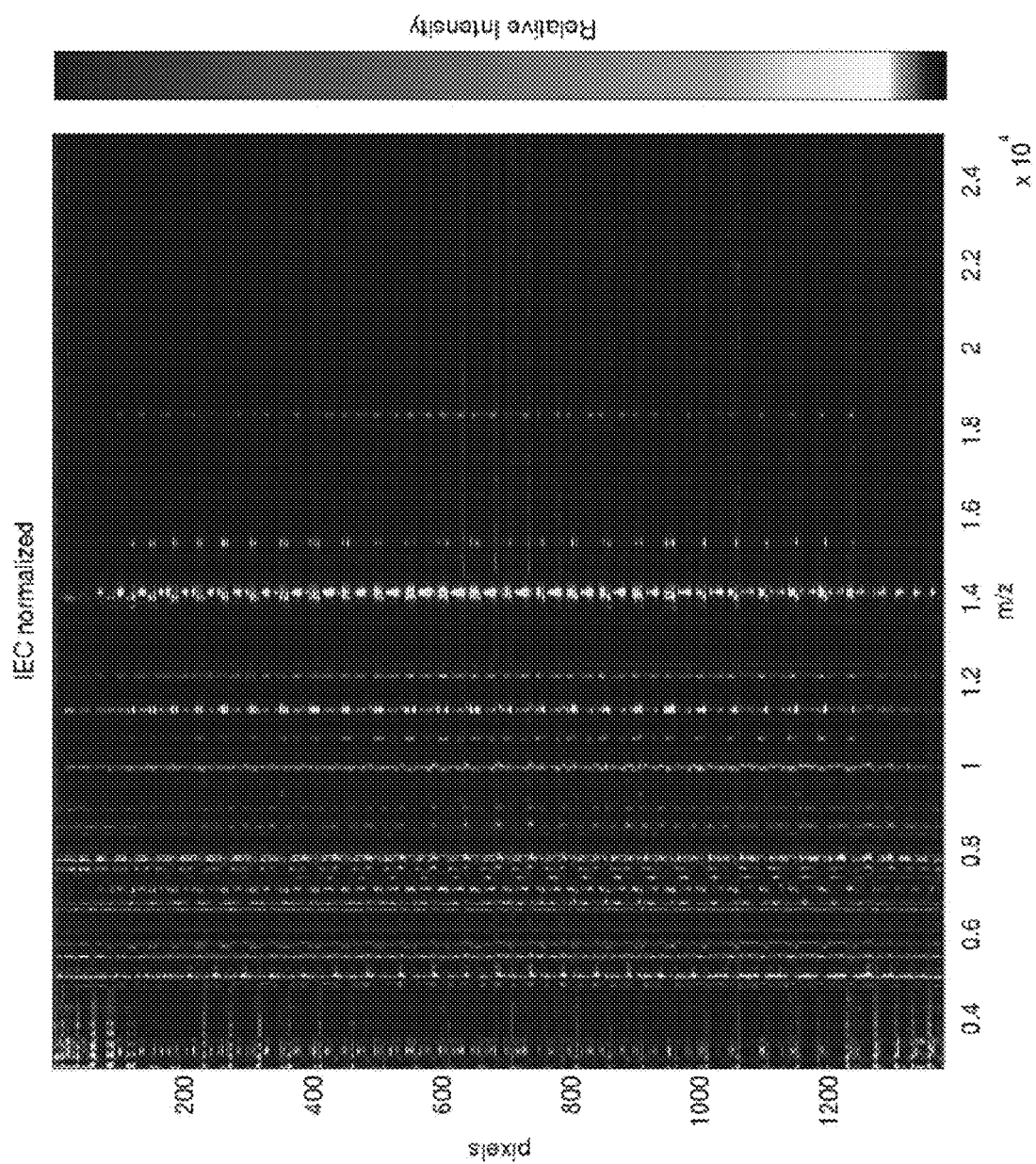
Fig. 1.17

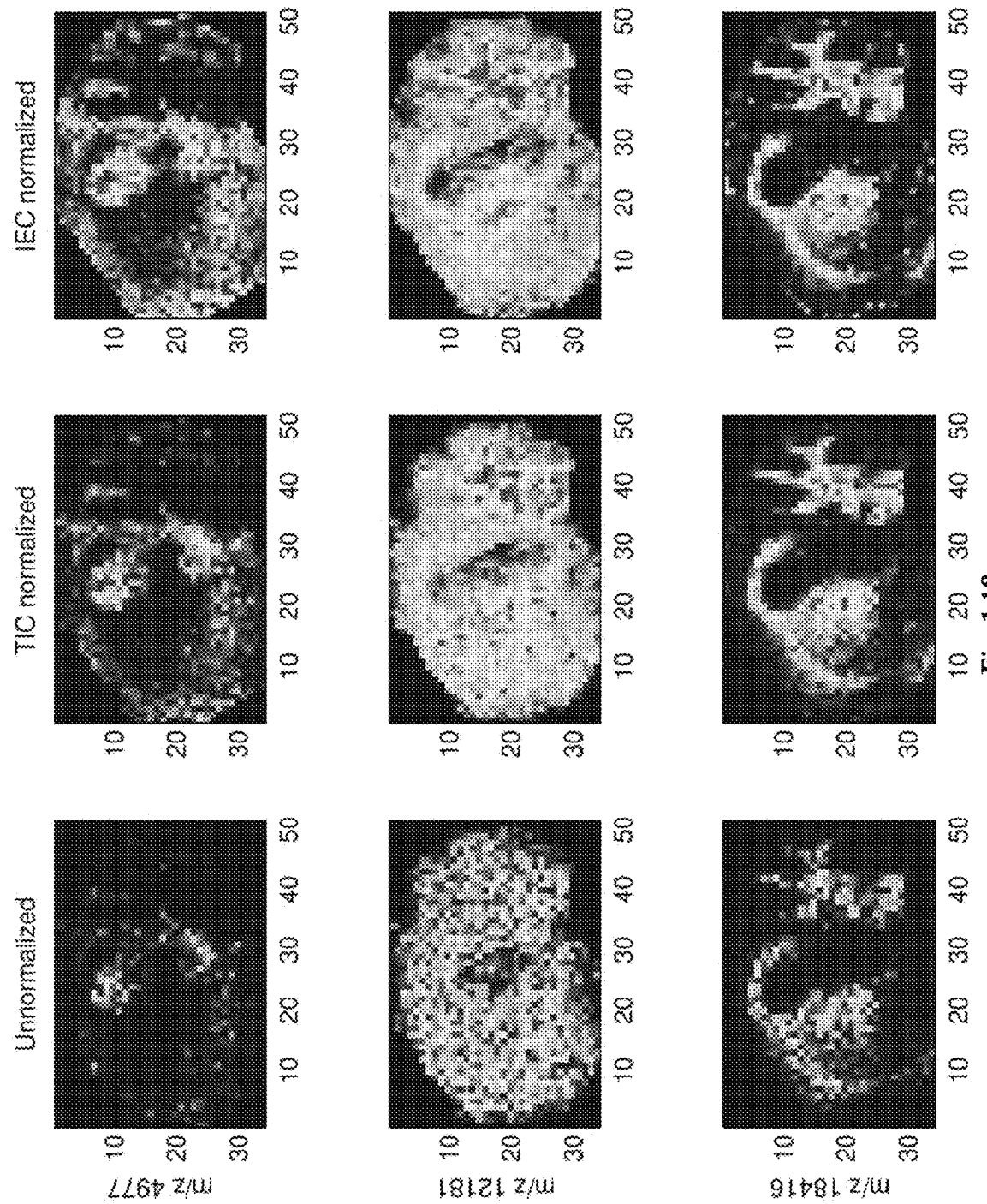
Fig. 1.18

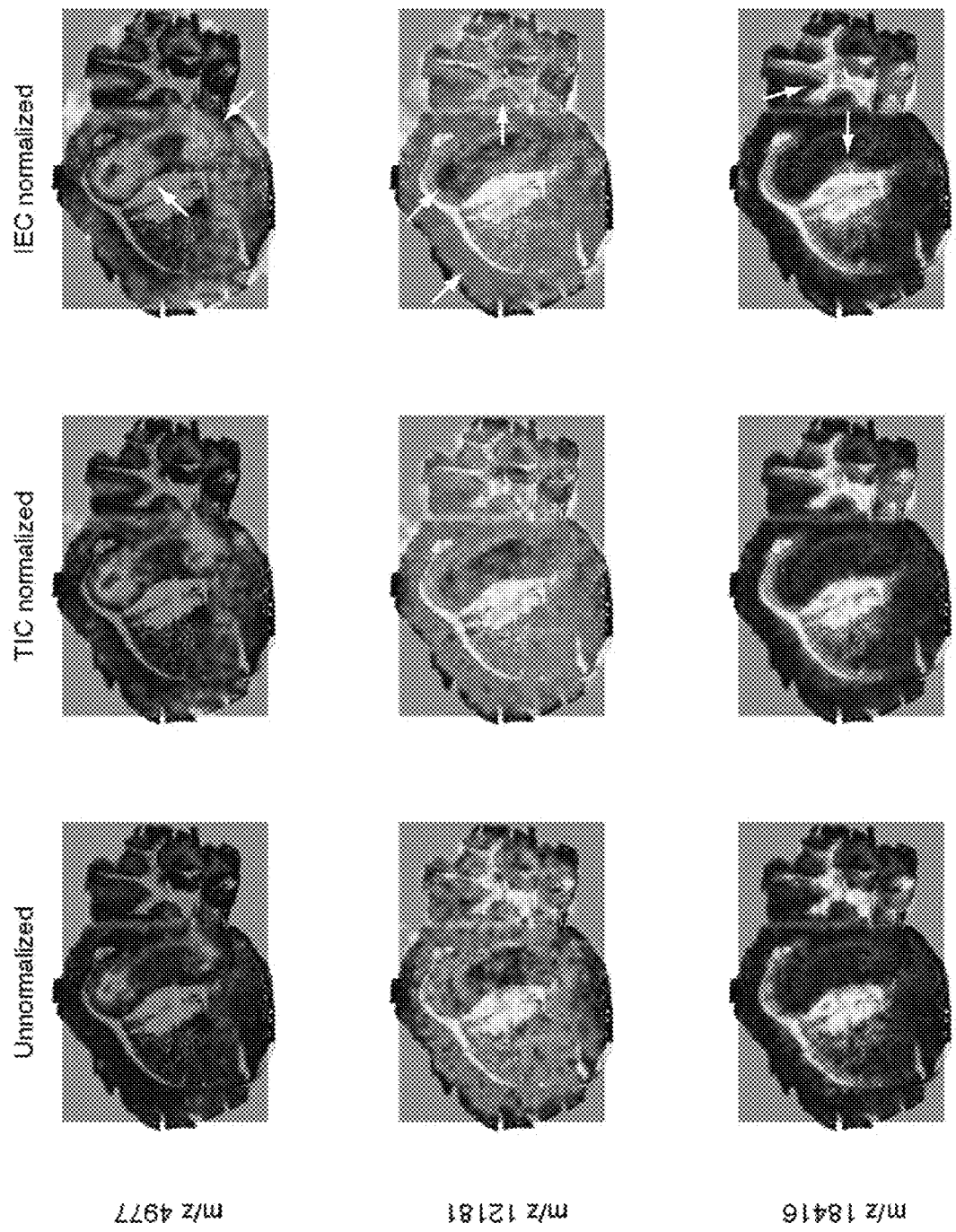
Fig. 1.19

INTENSITY NORMALIZATION IN IMAGING MASS SPECTROMETRY

CROSS-REFERENCE TO RELATED APPLICATIONS

This application is a continuation application of U.S. application Ser. No. 13/640,367 filed Oct. 10, 2012, which is a § 371 national stage entry of International Application No. PCT/BE2011/000022, filed Apr. 12, 2011, which claims priority to Great Britain Patent Application No. 1005959.0 filed Apr. 12, 2010, the entire contents of which are incorporated herein by reference.

BACKGROUND AND SUMMARY

Background of the Invention

A. Field of the Invention

The present invention relates generally to a system or apparatus adapted to separate and quantitatively analyze a species (analyte), for instance a spectrometry system to measure the molecular content of a species in a sample or in a matrix such as a tissue or a biofilm, the system or apparatus comprising a processor for receiving and processing signals from its detector to remove undesirable variation or noise before further processing into a spectrum, whereby the processor is programmed by a novel program for normalization preprocessing of the signals, which does remarkably better than area-under-the-curve based approaches (such as the standard TIC based approach, but also other measures such as root-mean-square) in a separation and quantitative analysis system. Additionally, the intelligent differentiation built into the approach typically outperforms approaches that depend on prior selection of a subset of variables (e.g. a mass range in mass spectrometry or an elution time window in chromatography), and automates this phase to avoid requiring user-supplied parameters or interaction.

Several documents are cited throughout the text of this specification. Each of the documents herein (including any manufacturer's specifications, instructions etc.) are hereby incorporated by reference; however, there is no admission that any document cited is indeed prior art of the present invention.

B. Description of the Related Art

In all fields of mass spectrometry, including mass spectral imaging, proper preprocessing of the acquired data enables obtaining a good interpretation of the measurements [M. Hilario, A. Kalousis, C. Pellegrini, and M. Mutter, *Mass Spectrom Rev*, vol. 25, no. 3, pp. 409-49, 2006; R. Hussong and A. Hildebrandt, *Methods Mol Biol*, vol. 604, pp. 145-61, 2010; L. Nie, G. Wu, and W. Zhang, *Crit Rev Biotechnol*, vol. 28, no. 4, pp. 297-307, 2008 and J. L. Norris, D. S. Cornett, J. A. Mobley, M. Andersson, E. H. Seeley, P. Chaurand, and R. M. Caprioli, "*Processing maldi mass spectra to improve mass spectral direct tissue analysis,*" Int J Mass Spectrom, vol. 260, no. 2-3, pp. 212-221, February 2007]. There is currently yet a need in the art for such proper preprocessing tools in particular for species with a high molecular content as is often the case with mass spectrometry and mass spectral imaging providing anatomical images or spectra with risk on multiplicative noise. Overall, the goal of the preprocessing phase is to filter undesirable influences from the raw measurements, and to provide a cleaned-up data set for further downstream analysis.

Such preprocessing method will try to remove undesirable variation or noise, in particular the causes of ion intensity noise from the mass spectral measurements in preparation for direct human interpretation or higher-level statistical analysis. Most preprocessing methods will attempt to counteract only a specific noise type, and as a result the preprocessing phase of a study can entail various steps. Typical examples include: baseline correction: quantifying and removing the chemical noise background; calibration: projecting the m/z range onto a set of known calibrants; alignment: projecting several spectra onto a common m/z scale; normalization: projecting peak heights from several spectra onto a common intensity scale; smoothing/denoising: removing ion detector and data acquisition induced jitter or peak detection: converting a mass spectral profile to a discrete set of peaks.

Present invention provides a new method of normalization of ion intensities across different mass spectra, which overcomes the caveat of undesirable variation or noise from the mass spectral measurements. This provides the ability to compare peak heights from one mass spectrum to another, which is particularly important both for standard mass spectrometry as well as mass spectral imaging. The invention also covers the application of this form of normalization in related fields such as chromatography, whereby chromatographic peak height (for example in liquid chromatography or a hyphenated mass spectrometry setup) becomes comparable from one measurement to another.

The performance of this new procedure of present invention, called Ionization Efficiency Correction (IEC), is demonstrated in several examples of this application. A first example follows a common experimental design in the field of biomarker discovery, in which mass spectrometry is used to compare the content of different samples. The data set is synthetically generated to provide a gold standard against which the algorithm's performance can be weighed. The second example is a mass spectral imaging experiment on a sagittal section of mouse brain, and highlights the value of the new approach from an imaging standpoint.

SUMMARY OF THE INVENTION

Some embodiments of the invention are set forth (in claim format) directly below:

In an embodiment, the present invention relates to an apparatus adapted to separate and quantitatively analyze a species, the apparatus comprising a processor adapted to receive and process signals from said its detector to remove undesirable variation or noise before further processing into a spectrum, characterized in that the processor is programmed for a normalization preprocessing of the signals of said apparatus, whereby the normalization process comprising the steps of a. Providing a data set of multiple spectra to normalize a given spectrum to. (The data set can be a complete experiment or a subset of an experiment.)

b. Separating the part common to all spectra from the parts that are differential.

c. Identifying which parts of the relative profiles of all these spectra are commonly found across the entire data set.

d. For each spectrum, calculating its common ion current (CIC), which is the sum of all ion counts only belonging to the part of the spectrum that is common in relative profile to other spectra in a data set.

e. For each spectrum, scale back the spectrum with the inverse of its CIC or a CIC-derived scaling factor.

In another embodiment, the present invention relates to an apparatus adapted to separate and quantitatively analyze a species, comprising a processor for receiving and processing signals from said its detector characterized in that to remove undesirable variation or noise before further processing into a spectrum the processor is programmed for a normalization preprocessing of the signals of said apparatus, whereby the normalization process comprising the steps of a. Providing a data set of multiple spectra to normalize a given spectrum to. (The data set can be a complete experiment or a subset of an experiment.)

b. Identifying which parts of the relative profiles of all these spectra are commonly found across the entire data set.

c. Obtaining the estimate for the CIC to separate the sum of all ion counts belonging to the part of the spectrum that is common in relative profile to other spectra in a data set (common ion current (CIC)) from the sum of all ion counts belonging to the part of the spectrum that is not common in relative profile to other spectra in a data set.

d. For each spectrum, calculate its common ion current (CIC), which is the sum of all ion counts belonging to the part of the spectrum that is common in relative profile to other spectra in a data set.

e. For each spectrum, scale back the spectrum with the inverse of its CIC or a CIC-derived scaling factor.

Another embodiment of the present invention comprises an apparatus adapted to separate and quantitatively analyze a species, comprising a processor for receiving and processing signals from said its detector characterized in that to remove undesirable variation or noise before further processing into a spectrum the processor is programmed for a normalization preprocessing of the signals of said apparatus, whereby the normalization process comprising the steps of a. Providing a data set of multiple spectra to normalize a given spectrum to. (The data set can be a complete experiment or a subset of an experiment.)

b. Identifying which parts of the relative profiles of all these spectra are commonly found across the entire data set.

c. By a decomposition algorithm extracting from a collection of spectra a single pseudo-spectrum that only contains common ion peaks and relative peak heights d. For each spectrum, calculate area-under-the-curve of the scaled common profile (common ion current (CIC))

e. For each spectrum, scale back the spectrum with the inverse of its CIC or a CIC-derived scaling factor.

In another embodiment, the present invention relates to an apparatus adapted to separate and quantitatively analyze a species, comprising a processor for receiving and processing signals from said its detector characterized in that to remove undesirable variation or noise before further processing into a spectrum the processor is programmed for a normalization preprocessing of the signals of said apparatus, whereby the normalization process comprising the steps of a. Providing a data set of N spectra that each contain M m/z bins b. Searching for a rank-1 approximation of the two-mode array or matrix containing all the spectra by organizing a rank-1 approximation of the N M data matrix, while penalizing differential peaks in the profile vector.

c. Generating a 1 M vector containing the common spectral profile and a N 1 vector containing scaling factors d. Using the scaling factors to calculate area-under-the-curve of the scaled common profile (common ion current (CIC)).

e. For each spectrum, scaling back the spectrum with the inverse of these scaling factors or a derivation thereof.

In yet another embodiment, the present invention relates to an apparatus adapted to separate and quantitatively analyze a species, comprising a processor for receiving and processing signals from said its detector characterized in that to remove undesirable variation or noise before further processing into a spectrum the processor is programmed for a normalization preprocessing of the signals of said apparatus, whereby the normalization process comprising the steps of a. Providing a data set of N spectra that each contain M m z bins b. A non-negative matrix factorization (NMF) algorithm is run several times on the data set in rank-1 mode, but each iteration the differential residuals are deducted from the data set.

c. Generating a 1 M vector containing the com mon spectral profile and a N 1 vector containing scaling factors d. Using the scaling factors to calculate area-under-the-curve of the scaled common profile (common ion current (CIC)).

e. For each spectrum, scaling back the spectrum with the inverse of these scaling factors or a derivation thereof.

Another aspect of the present invention relates to an apparatus adapted to separate and quantitatively analyze a species, comprising a processor for receiving and processing signals from said its detector characterized in that to remove undesirable variation or noise before further processing into a spectrum the processor is programmed for a normalization preprocessing of the signals of said apparatus, whereby the normalization process comprising the steps of a. Establishing a pseudo-spectrum of the common peaks and generating a scaling factor for each individual spectrum to separate the common ion counts from the differential ion counts.

b. Estimating the CIC of a spectrum as the area-under-the-curve of the common profile (determined in step one), scaled by that spectrum's individual scaling factor (also determined in step one).

c. Scaling back the entire spectrum, not just the common parts, with the inverse of the CIC or a derivation thereof.

1. The apparatus according to any one of the embodiments disclosed above, can be characterized in that the processor is programmed for a normalization preprocessing of the signals of said apparatus, whereby the normalization process is without a total ion current (TIC)-based normalization step to assure that that ionization efficiency are compared and rectified on the basis of the parts that are common between two spectra and not on the basis of the parts that are differential or can be characterized in that the processor is programmed for a normalization preprocessing of the signals of said apparatus, whereby the normalization process is without a total ion current (TIC)-based normalization step to assure that that only ion counts from analytes common to all spectra are used to calculate the normalization.

The apparatus according to any one of the embodiments referred to hereabove is in a particular embodiment adapted to measure the molecular content of species in a carrier for instance in a tissue.

As additional particular feature, the apparatus according to any one of the embodiments the normalization is an ionization efficiency correction; is a chromatography system; is a molecular chromatography system; is a chromatography-spectroscopy system; is an ionization measurement apparatus; is a spectrometer; is a mass spectrometer; is an ion mass spectrometer or is a spectrometer, whereby the processor to receive and process signals (e.g. current signals) from the ion detection means, whereby for instance the signals are processed into information that demonstrates relative current produced by ions (relative abundance or relative intensity) in relation to varying mass/charge ratios. Moreover, such spectrometer can comprise an electronic detection means for ion detection (the detector), and further comprises a means for desorption or vaporization, an ionization means (the ion source) and an ion acceleration means with ion separation or deflection means to separate ions, for instance according to their mass and charge (the mass analyzer). An another feature of present invention can be that the spectrometer comprises 1) an ion source for ionizing a specimen (e.g. a vaporized sample) to generate ions (e.g. to convert gas phase sample molecules into ions), 2) an ion sorting means, the so called mass or ion mobility analyser, resp. for sorting and separating ions according to their mass and charge or their mobility, which comprises an ion transport portion for transporting the ions (e.g. by acceleration in an electric or magnetic field) with a mass or mobility selection and/or analysing means for calculation of the m/z or mobility ratios based the detailed motion of the ions passing the field (e.g. a time-of-flight analyzer, (linear) quadrupole mass analyzer, quadrupole ion trap or orbitrap available in the art); 3) a detector, optionally foreseen with an amplifier, for recording either charge induced or current produced when an ion passes by or hits a surface 4) a processor for receiving and processing signals from said detector and 5) optionally a screen to display the mass spectrometric measurements.

An embodiment of the present invention relates to any apparatus according to any one of the previous embodiments, which comprises a storage means to store the processed signal electronically or which a display means to display relative abundance or intensity of ion with a specific mass-to-charge ratio (m/z) in peaks on a graphic (the mass spectrum).

Yet another embodiment of present invention is the apparatus according to any one of the previous embodiments for use in a diagnostic medical treatment of a subject to diagnose for or visualize a disorder.

Yet another embodiment of present invention is the apparatus according to any one of the previous embodiments for use in a diagnostic medical treatment of a subject to diagnose for relative peak height changes representative for a disease state or condition through classification. Such the apparatus according to any one of the previous embodiments can be used for analyzing high molecular content species such as tissues, biofilms, and complex molecules.

Other aspects of the present invention relate to various uses such as:

use of the apparatus according to any one of the previous embodiments for discovering new biomarkers;

use of the apparatus according to any one of the previous embodiments when operational in its processor to filter undesirable influences from its raw measurements and to provide a cleaned-up data set for further downstream analysis;

use of the apparatus according to any one of the previous embodiments when operational in its processor to remove undesirable variation or noise, in particular to remove the causes of ion intensity noise from the (mass) spectral measurements;

use of the apparatus according to any one of the previous embodiments when operational in its processor to improve processing into interpretable measurements;

the use of the apparatus according to any one of the previous embodiments when operational in its processor to decrease or minimize influences other than abundance;

use of the apparatus according to any one of the previous embodiments when operational in its processor to increase the reliability of peak heights, comparable across different mass spectra or measurements;

use of the apparatus according to any one of the previous embodiments when operational in its processor to linearize the physical relationship between a amount of a particular molecular species and the peak height recorded at a certain mass-overcharge value for species with a molecular content;

use of the apparatus according to any one of the previous embodiments when operational in its processor to decrease noise factors that perturb peak height, such as wet lab factors (e.g. differences in sample preparation), instrument factors (e.g. ionization efficiency and ion detector saturation), ion intensity noise factors which are molecule-specific, or noise factors that have a global effect across the entire mass range (e.g. variation in the concentration of matrix crystals), whereby the noise factors can be global noise factors and eventually without a pre-estimated estimate of the "noise scaling factor";

use according to the apparatus according to any one of the previous embodiments when operational in its processor to remove undesirable variation or noise before further processing into a spectrum or graph;

use according to the apparatus according to any one of the previous embodiments when operational in its processor to normalize the ion intensities and make peak heights comparable from one mass spectrum to another;

use according to the apparatus according to any one of the previous embodiments when operational in its processor to identify the presence or absence of an ion species, and/or to quantify said ions (in order to compare said ion species in a certain tissue sample with another tissue;

use according to the apparatus according to any one of the previous embodiments when operational in its processor to remove disturbance factors on the abundance to improve comparison between spectra of a species or a sample with the peak heights directly representing ion abundance and indirectly the concentration of an analyte;

use according to the apparatus according to any one of the previous embodiments when operational in its processor to make peak heights (ion intensities) comparable from one spectrum to the next;

use according to the apparatus according to any one of the previous embodiments when operational in its processor to make peak intensities comparable from one pixel to another in mass spectral imaging or imaging mass spectrometry;

use according to the spectrometer according to any one of the previous embodiments when operational in its processor to analyze a sample containing biomolecules (or otherwise useful molecules) and to compare such molecules and their distribution across various samples.

use according to the apparatus according to any one of the previous embodiments when operational in its processor to chart the variation in protein content and distribution associated with disease; and/or use according to the apparatus according to any one of the previous embodiments when operational in its processor to remove multiplicative noise that cannot be transformed through for example log-transformation.

Another embodiment of the present invention comprises a processor which is programmed for a normalization of "chromatographic" style output signals where the signal represents a collection of peaks distributed across a x/y scale, where the peak heights are proportional to the concentration/abundance/intensity of a measured event, for instance output signals of an apparatus of the group consisting of liquid chromatograph (LC), gas chromatograph (GC) and densitometric scanner or of the method of the group consisting of liquid chromatography (LC), gas chromatography (GC) and densitometric scanning, whereby the normalization process comprising the steps of a. Providing a data set of multiple measurements to normalize a given measurement to. (The d ta set can be a complete experiment or a subset of an experiment.)

b. Identifying which parts of the relative profiles of all these measurements are commonly found across the entire data set.

c. By a decomposition algorithm extracting from a collection of measurements a single pseudo-measurement that only contains common peaks and relative peak heights d. For each spectrum, calculate area-under-the-curve of the scaled common profile (common area-under-the-curve (CAUC))

e. For each chromatogram or measurement, scale back the its values with the inverse of its CAUC or a derivation thereof.

In another embodiment, the present invention relates to a method of diagnosing of a disorder or biological abnormality, characterized in that the method comprises processing of a plurality of variables obtainable from assaying of spectroscopic images or profiles of a patient, whereby the method comprises normalization preprocessing of signals of said spectrometer, whereby the normalization process comprising the steps of a. Providing a data set of multiple spectra to normalize a given spectrum to. (The data set can be a complete experiment or a subset of an experiment.)

b. Separating the part common to all spectra from the parts that are differential.

c. For each spectrum, calculating its common ion current (CIC), which is the sum of all spectroscopic (usually ion) counts belonging to the part of the spectrum that is common in relative profile to other spectra in a data set.

d. For each spectrum, scale back the spectrum with the inverse of its CIC or derived measure thereof.

In a particular embodiment of the present invention relates to an operating system for operating the methods according to any one of the previous embodiments mentioned herebove which controls the allocation of an assay system to generate biomarker values of a patient and which feeds the input signals from the assay system into a signal processor comprising a mathematical model that is described on the relationship of a plurality of biomarker variables and a plurality of disorder variables from assaying of biological samples of a plurality of patients with no disorder, affected with disorder, affected with a defined seriousness or with defined progress of disorder. Such operating system can be for determining the presence or absence of disorder, the seriousness of disorder or the progress of disorder in the patient according to any one of the previous embodiments.

An additional feature is that the operating system according to any one of the embodiments also controls usage of the essay system.

As yet another additional feature, the operating system according to any one of the embodiments includes a user interface to enable the user to interact with the functionality of the computer.

As yet another additional feature, the operating system according to any one of the embodiments includes a graphical user interface whereby the operating system controls the ability to generate graphics on the computer's display device that can be displayed in a variety of manners representative for or associated with the condition of disorder in a selected patient or a group of patients to allow a user to distinguish between the absence of disorder, the seriousness of disorder or the progress of disorder in identified patients or patient groups.

Yet another, embodiment of present invention concerns a computer-executable code, stored in a computer-readable medium, the is adapted, when running on a computer system, to run the operating system according to any one of the embodiments mentioned above or to execute the model described in any of the embodiments mentioned above, and to direct a processing means to produce output signals that are representative for a condition of disorder or a modifying condition of disorder.

DETAILED DESCRIPTION

Detailed Description of Embodiments of the Invention

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Definitions

"m/z" is mass over charge ratio; PCA is principal component analysis [I. T. Jolliffe, Principal component analysis, 2nd ed. New York: Springer, 2002. and M. Ringner, "What is principal component analysis?" Nat Biotechnol, vol. 26, no. 3, pp. 303-4, March 2008.]

An "assay" in the meaning of this application is an analysis or procedure to determine the presence or absence of one or more molecular species in an organism or an organic sample. A quantitative assay also measures the quantity of its target analyte in the sample.

The "total ion current" in the meaning of present invention is the sum of the separate ion currents carried by the different ions contributing to the spectrum [A. D. McNaught and A. Wilkinson, Compendium of chemical terminology: IUPAC recommendations, 2nd ed. Oxford: Blackwell Science, 1997. [Online]. Available: goldbook.iupac.org/index-.html]. From a mathematical standpoint, the sum of all ion counts in a mass spectrum irrespective of ion species, or the integral over the mass spectral profile.

"Ionization efficiency" in the meaning of this application is the ratio of the number of ions formed to the number of electrons or photons used in an ionization process [A. D. McNaught and A. Wilkinson, Compendium of chemical terminology: IUPAC recommendations, 2nd ed. Oxford: Blackwell Science, 1997. [Online]. Available: goldbook.iupac.org/index.html].

In this application a "mass" or "m/z" means" a mass to charge ratio, and a "mass range" or a "m z range" means a range for the mass to charge ratio. A linear dynamic range is the range over which an ion signal is in a linear to the corresponding analyte concentration. Mass accuracy is the ratio of the m/z measurement error to the true m z. The mass resolving power is the measurement of the ability to distinguish two peaks of slightly different m/z.

Spectrometry is the spectroscopic technique used to assess the concentration or amount of a given chemical (atomic, molecular, or ionic) species. In this case, the instrument that performs such measurements is a spectrometer, spectrophotometer, or spectrograph.

A mass spectrometer is an apparatus for the determination of the elemental composition of an analyte sample or molecule and/or for elucidating the chemical structures of molecules, such as peptides and other chemical compounds. The mass spectrometry principle consists of ionizing chemical compounds of an analyte to generate charged molecules or molecule fragments, transporting such ions by a potential (e.g. under an either static or dynamic magnetic or electric field) and measurement of their mass-to-charge (m/z) ratios.

A species in the meaning of this application is a particular analyte, molecule or chemical (atomic, molecular, or ionic). It can for instance concerns peptides, polynucleotides, small molecules, lipoproteins.

A mass spectrometer for proteomics briefly is an apparatus that ionizes vaporized or desorbed samples to generate charged molecules or molecule fragments and that measures their mass-to-charge ratios. Typically such mass spectrometer includes: 1) an ion source for ionizing a specimen (e.g. a vaporized sample) to generate ions (e.g. to convert gas phase sample molecules into ions), 2) an ion sorting means, the so called mass analyser, for sorting and separating ions according to their mass and charge which comprises an ion transport portion for transporting the ions (e.g. by acceleration in an electric or magnetic field) with a mass selection and/or analysing means for computation of the m/z ratios based on the detailed motion of the ions passing through the field (e.g. a time-of-flight. analyzer, (linear) quadrupole mass analyzer, quadrupole ion trap or orbitrap available in the art); 3) a detector, optionally foreseen with an amplifier, for recording either charge induced or current produced when an ion passes by or hits a surface; 4) a processor for receiving an and processing signals from said detector and 5) optionally a screen to display the mass spectrometric measurements.

"Electrospray ionization" (ESI) is a technique used in mass spectrometry to produce ions. It is especially useful in producing ions from macromolecules because it overcomes the propensity of these molecules to fragment when ionized. Mass spectrometry using ESI is called electrospray ionization mass spectrometry (ESI-MS) or, less commonly, electrospray mass spectrometry (ES-MS). Electrospray ionization is the ion source of choice to couple liquid chromatography with mass spectrometry. The analysis can be performed online, by feeding the liquid eluting from the LC column directly to an electrospray, or offline, by collecting fractions to be later analyzed in a classical nanoelectrospray-mass spectrometry setup.

"Matrix-assisted laser desorption ionization" (MALDI) is a technique used in mass spectrometry to produce ions. It is especially useful in producing ions from macromolecules because it overcomes the propensity of these molecules to fragment when ionized by embedding the molecules into a 'matrix' of chemical crystals that adsorb some of the impact energy from the laser. It is of particular interest with regard to applications that employ some form of surface chemistry, and its ability to retain the spatial origin of the measurements makes it well suited for molecular imaging approaches such as MALDI based mass spectral imaging, also known as imaging mass spectrometry.

"High molecular content". Tissues, bio films, and complex molecules have an inherent and high/complex molecular content. Imaging mass spectrometry is a mass spectrometry based methods that can be directly applied to a tissue or to tissues to measure its molecular content. A high molecular content in the meaning of imaging mass spectrometry can be the parallel analysis of hundreds of biomolecules, exquisite sensitivity, qualitative and quantitative analysis, and the ability to distinguish between close variants and/or the simultaneously analyze the distribution of hundreds of such biomolecules. This can be enforced with High throughput imaging MS: for instance a Bruker UltrafleXtreme high speed mass spectrometer enables clinical tissue arrays to be analyzed at cellular resolution and thus each tissue to be described, analyzed and classified according to its molecular content. Furthermore Ultrahigh mass resolution imaging MS provide the possibility to distinguish lipids and metabolites which have almost identical masses. For instance the ultra high mass resolution of a 9.4 T Fourier transform ion cyclotron resonance mass spectrometer can distinguish between these ions and thus allows the distributions of many lipids and metabolites to be simultaneously measured. These instruments provide rich datasets and integrate the results with established single molecule molecular imaging technologies.

Preprocessing for Normalization

Preprocessing of signals of a spectrometer, in particular a mass spectrometer, aims at removing undesirable variation or noise before further processing into a spectrum. One of the primary preprocessing steps in mass spectrometry is normalization. The goal of a normalization procedure is to normalize the ion intensities and make peak heights comparable from one mass spectrum to another. Many applications of mass spectrometry require information not only on the presence or absence of an ion species, but they also require some indication of quantity regarding those ions. As there is a relationship between the concentration of an analyte and its ion count as reported in a mass spectrum, peak heights can serve as indicators of quantity. However, the reliable use of peak heights depends on whether influences other than abundance can be minimized. The need for reliable peak heights, comparable across different mass spectra, spans a very wide range of biochemical applications. In qualitative analyses aiming to understand the content of a sample, peak height is sometimes used to establish an indication of confidence, by enabling the calculation of a signal-to-noise ratio (SNR) for each ion species under consideration. Qualitative analyses are typically found in areas such as protein identification [M. Kinter and N. E. Sherman, New York: John Wiley, 2000; B. Lu, A. Motoyama, C. Ruse, J. Venable, and J. R. Yates, 3rd, *Anal Chem*, vol. 80, no. 6, pp. 2018-25, March 2008; L. Martens and R. Apweiler, *Methods Mol Biol*, vol. 564, pp. 245-59, 2009, J. Stauber, L. MacAleese, J. Franck, E. Claude, M. Snel, B. K. Kaletas, I. M. V. D. Wiel, M. Wisztorski, I. Fournier, and R. M. A. Heeren *J Am Soc Mass Spectrom*, vol. 21, no. 3, pp. 338-47, March 2010 and A. R. Farley and A. J. Link, *Methods Enzymol*, vol. 463, pp. 725-63, 2009]. and the search for post-translational modifications [A. R. Farley and A. J. Link, "*Identification and quantification of protein posttranslational modifications,*" Methods Enzymol, vol. 463, pp. 725-63, 2009 and N. L. Young, M. D. Plazas-Mayorca, and B. A. Garcia, "*Systems-wide proteomic characterization of combinatorial post-translational modification patterns,*" Expert Rev Proteomics, vol. 7, no. 1, pp. 79-92, February 2010.] In quantitative applications, peak height as an indicator of abundance lies central to the analysis. Quantitative analyses span a multitude of approaches ranging from isotope labeling to label-free methods, and from absolute quantification to relative profiling. An example of absolute quantification is the use of mass spectrometry as a pharmacokinetic assay, tying an absolute peak height to a certain concentration of the target analyte per unit volume or mass of sample [M. W. Duncan, P. J. Gale, and A. L. Yergey, *The principles of quantitative mass spectrometry*, 1st ed. Denver, Colo.: Rockpool Productions, 2006; M. W. Duncan, H. Roder, and S. W. Hunsucker, "*Quantitative matrix-assisted laser desorption/ionization mass spectrometry,*" *Brief Funct Genomic Proteomic*, vol 7, no. 5, pp. 355-70, September 2008; H. Humbert, M. D. Cabiac, J. Barradas, and C. Gerbeau, "*Evaluation of pharmacokinetic studies: is it useful to take into account concentrations below the limit of quantification?*" *Pharm Res*, vol. 13, no. 6, pp. 839-45, June 1996; G. Liebisch, M. Binder, R. Schifferer, T. Langmann, B. Schulz, and G. Schmitz, "*High throughput quantification of cholesterol and cholesteryl ester by electrospray ionization tandem mass spectrometry (esi-ms/ms),*" *Biochim Biophys Acta*, vol. 1761, no. 1, pp. 121-8, January 2006 and D. Mims and D. Hercules, "*Quantification of bile acids directly from plasma by maldi-tof-ms,*" *Anal Bioanal Chem*, vol. 378, no. 5, pp. 1322-6, March 2004]. Most quantitative applications of mass spectrometry however are of the biomarker profiling type. These do not ascribe a meaning to absolute peak heights, but look rather for relative peak height changes that can be tied to a particular disease state or condition through classification [M. W. Duncan, H. Roder, and S. W. Hunsucker, "*Quantitative matrix-assisted laser desorption/ionization mass spectrometry,*" *Brief Funct Genomic Proteomic*, vol. 7, no. 5, pp. 355-70, September 2008., N. G. Ahn, J. B. Shabb, W. M. Old, and K. A. Resing, "*Achieving in-depth proteomics profiling by mass spectrometry,*" *ACS Chem Biol*, vol. 2, no. 1, pp. 39-52, January 2007, P. C. Carvalho, J. Hewel, V. C. Barbosa, and J. R. Yates, 3rd, "*Identifying differences in protein expression levels by spectral counting and feature selection,*" *Genet Mol Res*, vol. 7, no. 2, pp. 342-56, 2008]. One particular area in which peak heights need to be directly compared from one spectrum to the next is mass spectral imaging. An ion image produced from a MSI experiment is simply a false color representation of peak height across an organic tissue section. The need for comparable peak intensities from one pixel to another is therefore readily apparent.

The Nature of Ion Intensity Noise:

A mass spectrometer establishes a physical relationship between a particular molecular species and the peak height recorded at a certain mass-over-charge value. In general, quantity is one of the most important factors in this relationship, meaning that a larger amount of molecules usually results in a larger ion count at the corresponding mass-over-charge bin. However, the link is rarely if ever as simple and as linear as that. In fact, peak height can be perturbed by wet lab factors such as differences in sample preparation and sample content [J. Franck, K. Arafah, A. Barnes, M. Wisztorski, M. Salzet, and I. Fournier, "*Improving tissue preparation for matrix-assisted laser desorption ionization mass spectrometry imaging, part 1: using microspotting,*" *Anal Chem*, vol. 81, no. 19, pp. 8193-202, October 2009.]. It can also be influenced by instrument factors such as ionization efficiency [F. Hillenkamp, M. Karas, R. C. Beavis, and B. T. Chait, "*Matrix-assisted laser desorption/ionization mass spectrometry of biopolymers,*" *Anal Chem*, vol. 63, no. 24, pp. 1193A-1203A, December 1991] and ion detector saturation. In the case of mass spectral imaging additional factors are introduced such as the topology and texture of the tissue, and the variation of matrix coating across the section. The best strategy is to minimize these noise factors on the wet lab side by taking care to keep all experimental parameters constant from one measurement to the next. A good example of such efforts includes the matrix deposition in MSI experiments, often performed by robotic spotters in an effort to put down as homogeneous a matrix coating as possible [J. Franck, K. Arafah, A. Barnes, M. Wisztorski, M. Salzet, and I. Fournier, "*Improving tissue preparation for matrix-assisted laser desorption ionization mass spectrometry imaging, part 1: using microspotting,*" *Anal Chem*, vol. 81, no. 19, pp. 8193-202, October 2009]. In practice however, some of the relevant parameters cannot be controlled to the extent necessary to do away with ion intensity noise. Compensation for this unavoidable noise type will therefore fall to computational methods on the in silico side. Some of the ion intensity noise factors are molecule-specific, and their influence is therefore local to a particular m/z area or bin (e.g. an ion overshadowed in the detector by a more abundant co-ionizing ion of nearby mass, or ions that due to conformational reasons which are not very inclined to ionize). Other noise factors have a global effect across the entire mass range (e.g. variation in the concentration of matrix crystals). The molecule-specific factors usually pose few problems for inter-spectrum comparisons as long as the same ion species is being compared across all spectra. More precisely, the goal of a differential analysis between spectra is not to compare abundance from one ion species to another species located elsewhere on the m/z scale, but rather to compare abundance of the same ion species from one sample to the next. This means that as long as the molecule-specific factors are kept the same across the different mass spectra, by keeping the experimental parameters as constant as possible, these effects usually need not be explicitly removed. The effect of the global noise factors however is usually much more extensive and can rarely be left unadjusted. This is why most normalization procedures in mass spectrometry target mass range-wide intensity noise. An explicit enumeration of the various physical noise effects in the ion source, the mass analyzer, and the ion detector would be a difficult endeavour as many of these processes are sometimes not yet fully understood, while others can be described with only the most elaborate of mathematical models [R. Knochenmuss and R. Zenobi, "*Maldi ionization: the role of in-plume processes,*" *Chem Rev*, vol. 103, no. 2, pp. 441-52, February 2003]. Instead of attempting to model each effect explicitly, normalization methods in mass spectrometry take an empirical stance, modeling global ion intensity noise simply as a straightforward linear scaling factor across the entire mass spectral profile. Although there is something to be said for more elaborate nonlinear noise models along the m/z axis, there are often insufficient clues as to the real ion intensities to fit a model more complex than a global scaling. The assumption of a global scaling due to noise, and counteracting it with a reverse scaling factor, has empirically been shown to give good results. One of global scaling's strong points is that in most cases it captures the bulk of the ion intensity noise, while at the same time avoiding overfitting. The problem of overfitting a noise model in mass spectrometry is not trivial. Usually there is very little information available external to the measurement (unless well-characterized calibrants are spiked into the sample, which is often unpractical). Additionally, most general mass spectrometry studies have an insufficient number of replicate measurements to reliably generalize from. Some more advanced models have been formulated [Y. V. Karpievitch, T. Tavener, J. N. Adkins, S. J. Callister, G. A.

Anderson, R. D. Smith, and A. R. Dabney, "*Normalization of peak intensities in bottom-up ms based proteomics using singular value decomposition,*" Bioinformatics, vol. 25, no. 19, pp. 2573-80, October 2009 and M. K. Kerr, M. Martin, and G. A. Churchill, "*Analysis of variance for gene expression microarray data,*" J Comput Biol, vol. 7, no. 6, pp. 819-37, 2000], but in general a global scaling factor remains the standard model for ion intensity noise.

Given the MALDI-based nature of the imaging experiments described in this document, it serves to mention that any mass spectrometry experiment using this type of ionization is particularly prone to ion intensity noise, making a normalization preprocessing step practically a prerequisite. The reason for the intensity noise lies in the use of matrix molecules to enable ionization. In MALDI-based measurements, analytes need to be embedded into matrix crystals to keep them intact during the laser-induced desorption and ionization phase. It is clear that in such a setup the number of analyte ions that are formed in the ion source, will not only be dependent on the amount of analyte present, but also on the amount of matrix crystals that are present. However, growing crystals on an analyte in a sample well and later repeating that process on another sample in another well, while trying to obtain the same concentration of crystals, is not an easy task. In the MALDI mass spectrometry field substantial research has gone into improving the matrix molecules [F. Hillenkamp, M. Karas, R. C. Beavis, and B. T. Chait, "*Matrix-assisted laser "desorption/ionization mass spectrometry of biopolymers,*" Anal Chem, vol. 63, no. 24, pp. 1193A-1203A, December 1991, C. Meriaux, J. Franck, M. Wisztorski, M. Salzet, and I. Fournier, "*Liquid ionic matrixes for maldi mass spectrometry imaging of lipids,*" J Proteomics, February 2010 and M. Mank, B. Stahl, and G. Boehm, "*2,5-dihydroxybenzoic acid butylamine and other ionic liquid matrixes for enhanced maldi-ms analysis of biomolecules,*" Anal Chem, vol. 76, no. 10, pp. 2938-50, May 2004], achieving more reproducible matrix deposition], and understanding the topic of matrix hotspots [J. Franck, K. Arafah, A. Barnes, M. Wisztorski, M. Salzet, and I. Fournier, "*Improving tissue preparation for matrix-assisted laser desorption ionization mass spectrometry imaging, part I: using microspotting,*" Anal Chem, vol. 81, no. 19, pp. 8193-202, October 2009]. Hotspots are certain areas in the sample showing better crystallization and therefore higher ion intensity and signal-to-noise ratio. Although significant progress has been made, the reproducibility of matrix conditions remains a point of attention in MALDI-based research, be it standard as well as imaging-oriented. MSI adds to the matrix difficulties with additional effects from the tissue layer, from which the analyte needs to be desorbed and on which the matrix needs to crystallize. This means that in MSI experiments it is not uncommon to see ion intensity not only influenced by matrix conditions, but also by the particular cell type from which the measurement is taken. Both the medium as well as the quality of the matrix embedding cause amplification or attenuation of ion formation in the source.

State of the Art Approach, Total Ion Current:

The common normalization methods in mass spectrometry operate on the global scaling assumption mentioned above. These algorithms consider ion intensity noise to be an undesirable scaling factor, which is different for every mass spectrum. The remedy seems evident: rescale the noisy spectrum with a scaling factor multiplicatively inverse to the noise scaling factor. The problem thus presents itself as a two-step procedure:

1. Find an estimate of the noise scaling factor.
2. Scale back the mass spectrum with the inverse scale factor.

The problem is that the noise scaling factor is unknown, and the only information available is the noisy spectrum. Unless external information is provided regarding the true ion intensities of the spectrum (e.g. an externally calibrated peak intensity), the algorithm has little clues on which to base its estimate in step 1.

The problem definition above describes the situation where the goal is to remove the ion intensity noise from the mass spectrum altogether. However, most experimental setups that include a cross-comparison between mass spectra only seek relative peak height changes. As mentioned in the introduction, normalization aims to project peak heights from several spectra onto a common intensity scale to allow relative comparison.

Whether or not that common intensity scale is the true intensity scale in the absence of noise, is irrelevant to most studies. The only requirement for relative comparisons of peak height is to establish a common ground between the spectra to scale towards. This common ground can be any measure that connects the ion intensities of the different spectra together. Various schemes have been suggested, particularly in the context of mass spectral search algorithms. One naive example is base peak normalization [G. Rasmussen and T. Isenhour, "*The evaluation of mass spectral search algorithms,*" J. Chem. Inf. Comput. Sci, vol. 19, no. 3, pp. 179-186, 1979], where spectra are scaled relative to each other such that their highest peak is equally high in all spectra. Another example is a method based on total ion current, which has been shown to produce much better results [G. Rasmussen and T. Isenhour, "*The evaluation of mass spectral search algorithms,*" J. Chem. Inf. Comput. Sci, vol. 19, no. 3, pp. 179-186, 1979, Z. B. Alfassi, "*On the normalization of a mass spectrum for comparison of two spectra,*" J Am Soc Mass Spectrom, vol. 15, no. 3, pp. 385-7, March 2004]. The total ion current (TIC) of a mass spectrum is the sum of the separate ion currents carried by the different ions contributing to the spectrum {A. D. McNaught and A. Wilkinson, Compendium of chemical terminology: IUPAC recommendations, 2nd ed. Oxford: Blackwell Science, 1997.] In mathematical terms, the TIC can be considered the sum of all ion counts collected in a mass spectrum, or the integral over the mass spectral profile. Scaling mass spectra such that they have the same TIC has become an ad hoc norm for normalization in many areas of mass spectrometry. For instance some use ProTS Data software (Efeckta Technologies, Inc.) for baseline substraction scaling of the spectra to a total ion current (TIC) based normalization (Riehen A. A. et al US2007/00691222). The rationale behind scaling towards a common TIC value makes physical sense. Distinct experiments, but executed with identical experimental parameters (e.g. laser intensity, sample amounts, . . . ), should arguably yield similar amounts of ions.

Most TIC-based normalization algorithms aimed at enabling relative comparisons, consist of these two steps:
1. For each mass spectrum, calculate its TIC
2. Scale back the mass spectrum with the inverse of its TIC.

Step 2 will scale all spectra to a TIC of one. Some algorithms however will scale towards a common TIC value (e.g. the median TIC of all spectra) instead. One reason for this is interpretation, in the sense that the normalized peak heights will be on a scale not too far removed from the original ion count values that were collected. Another reason is numerical precision and memory requirements. Because of memory and computation considerations, some implementations are better served with an integer based ion count than real values between zero and one. Theoretically all these TIC based approaches are equivalent as they all retain the relative differences regardless of the absolute intensity scale of the normalization result.

FIG. 1.1 gives an example of how a TIC-based normalization works for the comparison of two real mass spectra. The spectra come from a tissue profiling experiment, and the normalization algorithm that is applied, is a standard TIC-based implementation called msnorm, provided with the Bioinformatics Toolbox of MATLAB (The Math Works, Natick Mass., USA). The algorithm took 100 percent of the spectras'TIC into account to calculate the resulting scaling factor. Although both spectra only contain positive values, one spectrum is shown as negative to enable easy comparison. A schematic overview of the two-step procedure is also shown in FIG. 1.3.

Problems with the State of the Art Total Current Approach:

Ionization efficiency is defined as the ratio of the number of ions formed to the number of electrons or photons used in the ionization process [A. D. McNaught and A. Wilkinson, *Compendium of chemical terminology: IUPAC recommendations*, 2nd ed. Oxford: Blackwell Science, 1997.]. If the laser intensity of a MALDI mass spectrometer is kept constant from one measurement to the next, ionization efficiency equates to the yield of ions formed in a mass spectral measurement. Scaling spectra to have the same ionization efficiency could therefore be considered scaling towards the same ion yield across all mass spectra. When all other parameters are kept the same, such an operation would indeed counteract the amplifying and attenuating effects presented in section 1.2. The key point however is that the statement "when all other parameters are kept the same" includes the sample content. At first glance it seems that if ionization efficiency at constant ionization energy is equal to ion yield, and if the total ion current is proportional to the ion yield hitting the detector, TIC can be a good measure for ionization efficiency. This reasoning forms the rationale behind most TIC-based normalization methods, and as a result these methods will try to equalize the total ion current across all spectra. The problem with TIC-based normalization methods is that this reasoning does not take into account differences in sample content, and their scaling is therefore done on the basis of a measure that is only partially proportional to ionization efficiency. The reason that sample content plays a role is that differences in molecular content will produce different peak patterns in the spectra. The ion counts tied into the peaks that are differential between the spectra are added to the TIC, but in reality these ion counts are not the result of a change in ionization efficiency, which is what the TIC is expected to report. The potential harm this wrong assumption holds, will depend on the particulars of the measurements (e.g. How different are the peak patterns from sample to sample?, How much of the TIC is differential?, . . . ). Although the repercussions might be negligible in some cases and the use of TIC normalization is certainly better than no normalization at all, the influence of differential peaks on TIC-based normalization is almost always present. Most studies compare samples that differ in molecular content. Often finding the differences is the reason for performing the study in the first place, and the alternative would invalidate any effort to look for biomarkers. In those cases the particulars of the measurements will decide whether TIC-based normalization will underperform. As an example, lets consider two samples. Both contain the same amount of analyte A. Only the second sample additionally contains analyte B in an amount similar to A. If both samples are coated with matrix and measured using the same laser power and under the same experimental conditions, you will normally get one peak of analyte A in the spectrum (considering molecular ions for this example and no fragmentation ions) of sample one and two peaks (A and B) in the spectrum of sample two. Even if the A peak is somewhat diminished in height due to the presence of B, it is clear that a TIC-based inverse scaling of sample two would count both A and B ion counts and could severely bias the height of peak A in sample two downward.

By including the ion counts from differential peak B, the TIC of sample two is estimated two times higher than the TIC of sample one. The result is that sample two is scaled down approximately twice too strongly. The result of a TIC-based normalization would be that peak A in sample two is only half as high as peak A in sample one, although they should represent the same quantity of analyte A. A graphic example of how TIC can steer normalization wrong is also shown in the schematic of FIG. 1.3. Some TIC-based methods can be made to compensate for the bias somewhat, by removing ion counts from peaks whose height falls within a certain user-defined quantile range or by using derived measures that emphasize the weight of larger peaks in the final scaling factor (e.g. root-mean-square). However, the same problem remains as there are no real rules of thumb for setting the value of the quantile parameter and the same effect would still be happening, only focused on smaller peaks. To summarize, ionization efficiency is a good basis for normalization between spectra. However, we posit that TIC is not a good measure for ionization efficiency. The reason is that ionization efficiency should be compared and rectified on the basis of the parts that are common between two spectra. Not on the basis of the parts that are differential, and the TIC cannot tell these two apart. In short, the more similar the content between samples, the better the TIC-based scaling. The more dissimilar the samples, the greater the bias. In studies that have a substantial amount of differential peaks from one sample to another, the bias of TIC-based methods can become troublesome. Particularly imaging mass spectrometry is vulnerable as these data sets typically contain spectra from a wide range of different cell types and anatomical regions.

Novel Approach. Ionization Efficiency Correction, of the Present Invention:

Given the problem with TIC-based methods highlighted in the previous section, we formulate a new normalization approach, named ionization efficiency correction (IEC).

The ionization efficiency provides clues towards projecting peak height intensities from different spectra onto a common scale. The difference with TIC-based methods lays in the fact that only ion counts from analytes common to all spectra are used to calculate the normalization. The participation of differential peaks in the scaling factor calculation is minimized. As we will demonstrate, TIC-based methods cannot tell the difference between common and differential content, while IEC can.

For reasons of clarity, let us define two additional concepts. The common ion current (CIC) of a mass spectrum is the sum of all ion counts belonging to the part of the mass spectrum that is common in relative profile to other mass spectra in a data set.

The differential ion current (DIC) of a mass spectrum is the sum of all ion counts belonging to the part of the mass spectrum that is not common in relative profile to other mass spectra in a data set. The TIC of a spectrum is the sum of its CIC and its DIC.

Ionization efficiency correction is a three-step normalization process:
1. Separate the part common to all spectra from the parts that are differential.
2. For each mass spectrum, calculate its CIC.
3. For each mass spectrum, scale back the mass spectrum with the inverse of its CIC.

Step two and three are similar to the operations applied in a TIC-based algorithm. The difference is that the traditional TIC is replaced by the CIC value, which is a better estimate of ionization efficiency. The crux of the method lies in obtaining the estimate for the CIC, which is the responsibility of step one. Given a data set of multiple mass spectra, the task of step one is to identify which parts of the relative profiles of all these spectra are commonly found across the entire data set. If such a common relative expression profile can be found for all spectra with an individual scaling factor for each mass spectrum, the CIC of a spectrum is simply the area-under-the-curve of the scaled common profile.

The task of extracting from a collection of mass spectra a single pseudo-mass spectrum that only contains common ion peaks and relative peak heights can be approached in a number of different ways. Considered from a linear algebra perspective, the problem of step one can be translated to the mathematical domain in terms of the search for a rank-1 approximation of the two-mode array or matrix containing all the mass spectra (Notice that the mathematical definition of a matrix applies here. This concept has no relation to the chemical matrix in which analytes are embedded for MALDI measurements).

A rank-1 approximation is a concept often used in the context of matrix decomposition methods. The goal of a rank-1 approximation is to approximate a matrix with the product of two vectors, as depicted in FIG. 1.2. In addition to looking for a rank-1 approximation, the search should be optimized towards avoiding the inclusion of differential peaks. Given a data set of N mass spectra that each contain M m/z bins, the task of step one will be to look for a rank-1 approximation of the N M data matrix, while penalizing differential peaks in the profile vector. This approximation entails a 1 M vector containing the common mass spectral profile and a N 1 vector containing scaling factors that will be used to calculate the CICs. Written as an optimization problem, this becomes:

| minimize | $\|D - sp^T\|^2$ | (1.1) |
|---|---|---|
| subject to | p containing no differential peaks | |
| where | $D \in R^{NM}$ | (mass spectral data set) |
| | $s \in R^N$ | (scaling factors) |
| | $p \in R^m$ | (mass spectral profile) |

Within the matrix decomposition field there are several different methods that can perform a rank-1 approximation, but most are tweaked towards optimizing different characteristics of the decomposition. Examples include principal component analysis (PCA) [I. T. Jollijfe, *Principal component analysis*, 2nd ed. New York: Springer, 2002. [Online]. Available: www.loc.gov/catdir/enhancements/fy0817/2002019560-t.html and M. Ringner, "*What is principal component analysis?*" Nat Biotechnol, vol 26, no. 3, pp. 303-4, March 2008], independent component analysis (ICA) [J. V. Stone, *Independent component analysis: a tutorial introduction.* Cambridge, Mass.: MIT Press, 2004], *and singular value decomposition (SVD)* [B. DeMoor and P. Van Dooren, "*Generalizations of the qr and the singular value decomposition,*" SIAM Journal on Matrix Analysis and Applications, vol. 13, no. 4, pp. 993-1014, October 1992 and G. Golub and W. Kahan, "*Calculating the singular values and pseudo-inverse of a matrix,*" Journal of the Society for Industrial and Applied Mathematics, Series B, vol. 2, no. 2, pp. 205-224, 1965]. Because of the need to minimize differential peaks, none of these algorithms provides out-of-the-box the rank-1 approximation we need.

Empirically however, we have attained good results with a modification of the non-negative matrix factorization (NMF) algorithm [D. Lee and H. Seung, "*Learning the parts of objects by non-negative matrix factorization,*" Nature, vol. 401, no. 6755, pp. 788-791, 1999]. In our implementation the basic NMF algorithm is run several times on the data set in rank-1 mode, but each iteration the differential residuals are deducted from the data set. This approach converges towards a rank-1 approximation with little or no remnants of non-common features in the profile. We use this decomposition algorithm a s the driving force behind step one, but it is clear that this phase of the algorithm is an inviting area for further advanced developments in the future. Conceptually, the IEC method can be considered a normalization framework in which a particular decomposition engine can be dropped to estimate the CIC.

Once a pseudo-spectrum of the common mass peaks has been established, accompanied by a scaling factor for each individual mass spectrum, we have the material necessary to tell the common ion counts and the differential ion counts apart. Step two then estimates the CIC of a mass spectrum as the area-under-the-curve of the common profile (determined in step one), scaled by that mass spectrum's individual scaling factor (also determined in step one). Step three scales back the entire mass spectrum, not just the common parts, with the inverse of the CIC. A schematic overview of the TIC-based methodology and the difference with the newer IEC approach is shown 1.3. In analogy to TIC-based methods, IEC could be labeled a CIC-based method.

One concern regarding IEC might be the following. In a situation where every photon fired at the sample is used up in the ionization process to yield an analyte ion, peak heights would drop when additional differential sample content shows up. In such a situation, TIC would indeed be equal to ionization efficiency (at constant ionization energy), and IEC might be misled. However, such a situation could only exist if the transfer from ionization energy to formed ions is 100 percent, which is extremely unlikely in real-world cases. Any real-life situation that falls short of this Utopian efficiency, can benefit from the IEC approach. The following sections will demonstrate the value of IEC in two distinct case studies.

EXAMPLES

Example 1: A Case Study: Synthetic Mass Spectrometry Data Set

The objective of the first case study is to give a concrete demonstration of the problems inherent to TIC-based normalization methods, and to quantify the improvements introduced by IEC normalization. A thorough comparison of normalization methods requires the availability of a gold standard against which the methods' performance can be measured. As real-world biological case studies can rarely provide sufficient characterization of the ion intensity noise on the measurements, this first case study will center on a synthetic mass spectral data set.

Creation of the Synthetic Data Set: The data set will mimic a typical experimental setup aimed at biomarker discovery. The data describes 25 individual mass spectral measurements, that are engineered to have both common as well as differential ion peaks. To ensure the authenticity of the study, the spectra are generated from a base pattern, which is a real mass spectrum from a profiling study on mouse brain. The peaks from the base pattern will be present in all 25 spectra at various peak heights, and will fulfill the role of common pattern across the data set. Adding differential peaks to the base pattern generates four additional classes of content. The added peaks are the mimicked by adding Gaussian distributions of various height and variance to the base pattern. To test the robustness of the algorithms, the shape of the additional peaks is varied. Pattern one adds only a few slim peaks. Pattern two contains different shapes through a fusion of peaks. Pattern three adds primarily wide peaks of low height, while pattern four contains a mixture. All five patterns span a m/z range from 2800 to 25000, as depicted in FIG. 1.4. By adding peaks to the base pattern, all patterns describe an area-under-the-curve or TIC that consists of both a common part and a pattern-specific differential part. The common part is equal to the base pattern and will give rise to the common ion current or CIC of the spectra generated from these spectra. The remainder of the TIC will give rise to the differential ion current or DIC of the derived spectra. FIG. 1.5 gives per pattern an overview of the proportion CIC versus DIC. The patterns represent five different content classes from which five 'samples' per class are added to the data set. Each pattern gives rise to five separate mass spectra, individually scaled with a noise scaling factor to mimic ion intensity noise. The noise scaling factors are randomly generated, and include both amplified as well as attenuated cases. By performing this scaling, ion intensity noise is added to the data set, and the ion intensity scales of the different mass spectra are dispersed. The goal of the normalization algorithms will now be to reverse the situation to a level that allows for solid relative comparison. Unlike in real-world case studies, here the noise scaling factors are known to us and can serve as a gold standard for normalization performance. FIG. 1.6 shows the noisy spectra that were generated and their respective scaling factors.

Comparison of Normalization Performance: First, a gold standard for normalization is established through inversion of the noise scaling factors that were used to create the data set. Then, both TIC-based and IEC normalization are applied to the noisy data set. The results are summarized in FIGS. 1.7, 1.8, 1.9, and 1.10. FIG. 1.6 shows a heat map representation of the noisy spectra.

Notice the ion intensity noise-induced striping of the spectra. Good normalization will need to remove that striping effect maximally. FIG. 1.8 shows the result after reverse scaling with the real noise factors. It is clear that the striping is gone and the noise is removed. FIG. 1.9 shows the results after using the classical TIC-based method. It shows good performance within content classes, but its normalization across different contents is incomplete. There is still definite striping between the spectra that only contain the base pattern and the ones that contain differential peaks as well. The heat map shows that the presence of non-common peaks increases the total ion count of the spectrum, and as a result overestimates the spectrum's ion yield from the sample.

The ramification of this overestimation is an underestimation of the necessary noise canceling factor. As a result, peak heights are too low compared to spectra that contain less differential peaks. FIG. 1.10 shows the results from the IEC algorithm. It shows no striping and is visually indiscernible from the gold standard pattern. Note that in most of these methods the absolute peak heights are never restored exactly. They only make spectra comparable at a relative level. The heat map illustrates that by using a rank-1 approximation of the spectra, IEC is able to avoid bias from differential peaks. FIG. 1.11 provides a closer look at some of the normalization results, by focusing on a zoomed section of the mass spectrum of sample 6. It shows the gold standard and both reconstructions for the sixth mass spectrum (with their intensities scaled between zero and one to enable direct comparison). The IEC traces the profile of the gold standard closely, while the TIC approach clearly underestimates the true peak heights. The excellent matchup between IEC and the gold standard keeps the gold standard, indicated in blue, largely hidden behind the red line of the IEC result. Only at the very tops of the peaks do the blue tips of the gold standard improve over the IEC result.

Comparison of Normalization Performance with Additive Noise: To demonstrate the robustness of the approaches, the experiment is repeated with additive noise. First, the same multiplicative ion intensity noise from the previous run is added. Then, Gaussian additive noise is put on top of all m/z bins with a standard deviation equal to one percent of the noisy data set's intensity range (s.d. of approx. 120 ion counts). The results are shown in FIG. 1.12 (noisy version), FIG. 1.13 (TIC normalized), and FIG. 1.14. Again the heat maps show that IEC outperforms TIC, even with a significant amount of additional noise added on top of the normalization problem. Whether the difference between IEC and TIC-based methods is significant, depends on the study at hand. The answer is tied to elements such as the available instrument, the sensitivity required to prove or disprove a hypothesis, and most importantly whether or not the samples in question are heterogeneous in content. The less heterogeneous, the more overlap between the spectra and the better TIC will perform. In general however, IEC will outperform TIC-based normalization in most cases because it takes the 'common versus differential' issue out of the hands of the experimental design, and provides in silico means of compensating for whatever form the measurements may take. This is an important asset as more and more studies are collecting ever larger amounts of measurements, cross-comparing spectra from a very wide variety of biological origins.

Example 2: A Case Study: Mass Spectral Imaging

Earlier mass spectral imaging was introduced as an area of mass spectrometry that is particularly sensitive to ion intensity noise. In the case of MALDI based MSI, one reason for this sensitivity is the matrix crystallization required by the ionization method. Also the fact that analytes are measured in situ without first separating the molecules from the surrounding tissue often plays an important role. The influence of the multiplicative ion intensity noise becomes readily visible in MSI. The most common use of MSI technology is in fact to produce ion images that show peak height across an entire organic tissue section, making the comparability of peak height from one pixel to the next crucial. Additionally, as computational MSI analysis develops further, the influence of reliable peak heights will become even more important than is currently the case with ion images. For this reason, this second case study centers on MSI and takes a closer look at IEC performance on a MSI experiment on mouse brain. A benefit of a MSI case study is that it enables intuitive assessment of the normalization results through pictures. Unlike the synthetic case study, real-world experiments are a noisy business and do not provide a gold standard against which to grade the performance of the algorithms. However, a MSI experiment is one of the few experiment types that provides the opportunity to see in the spatial domain whether the normalization results make biological sense. For example, if an anatomical region is more homogeneously filled or outlined, there is a high probability that the algorithm succeeded in extracting more useful information from the measurements, and thus exhibits better performance. This case study therefore takes a closer look at ion images to assess TIC versus IEC performance.

The MSI experiment is performed on a sagittal section of mouse brain, using a MALDI mass spectrometer. The data set consists of 1734 mass spectra collected from the mouse brain section in a rectangular grid of 51 34 pixels. Each mass spectrum captures 6490 m/z bins spanning a range from m/z 2800 to 25000. As the rectangular grid has to circumscribe the entire tissue section, certain mass spectra stem from outside the tissue area. These are removed from the case study to avoid introducing non-tissue derived variation into the analysis. After retaining only the on-tissue spectra, the data set consists of 1381 mass spectra that make up a data matrix of 1381 6490 ion count values. The baseline is removed from the analysis to avoid it being an influential factor in the assessment of normalization performance. Similar in approach to the synthetic case study, we first collect a heat map representation of the 1381 spectra in their un-normalized form in FIG. 1.15. The FIGURE shows only the highest peaks clearly in some of the rows. The other peaks largely disappear at the lower ion count values. Then, TIC-based normalization is applied to the data set, resulting in the spectra of FIG. 1.16. Compared to FIG. 1.15, the heat map clearly demonstrates that normalization is a worthwhile endeavor in MSI. TIC-based normalization succeeds in pulling several new peaks from the measurements. A good sign for the reliability of these peaks is that they show up consistently across different spectra, appearing as vertical lines in the heat map. Unlike in the synthetic data set where horizontal striping in the heat map was used as a clue to point out incomplete normalization, the striping effects in these heat maps have a different cause. They have little to do with normalization, but are the result of pushing measurements that are acquired from a rectangular grid into a list format. The 'breaks' in the vertical lines therefore usually occur at intervals equal to the width of the measurement grid (e.g. roughly every 51 or 34 spectra). Finally, the ionization efficiency correction algorithm is applied. The results, shown in FIG. 1.17, clearly show that IEC is capable of extracting even more consistent peaks from the spectra than the TIC-based method could. The lower mass range shows much richer variation, and IEC seems particularly successful in pulling low intensity peaks over the noise threshold. This property of IEC is very interesting as sensitivity is a big topic of concern in MSI. Overall, the observations from the heat maps confirm the conclusions from the synthetic case study: any form of normalization is better than none, but the new IEC method does remarkably better than the standard TIC-based approach.

However, to truly assess the value of IEC for MSI experiments, we need to take a look at the ion images produced from these data sets. Based on the heat maps from FIGS. 1.15, 1.16, and 1.17, three ion peaks are selected for comparison in the spatial domain. These ions are m/z 4977, 12181, and 18416, and ion images stemming from the un-normalized, the TIC normalized, and the IEC normalized data set are extracted for each of them. The results are shown in grid form in FIG. 1.18. To ease biological interpretation they are shown again in FIG. 1.19, transparently overlaid on a microscopic image of the mouse brain tissue. Again, the need for ion intensity normalization in MSI is clearly demonstrated. The un-normalized ion images only make anatomical sense for the tallest of peaks. Ion m/z 12181 shows little or no structure in the raw form, while as soon as some form of normalization is applied it clearly shows increased presence in the cerebellar nucleus on the right hand side, and a marked absence from the central hippocampal area. Similar observations can be made for ion m/z 4977 and 18416. The differences between the TIC-based method and IEC are more nuanced. However, they do become abundantly clear when the anatomical background is taken into account. FIG. 1.19 highlights some of the differences with arrows. The general observation seems to be that after performing IEC, the anatomical regions are more homogeneously filled and their outlines more clearly traced. For m/z 4977, this means that its presence is more widely confirmed throughout the upper and lower hippocampal area. For m/z 12181, its absence from the hippocampus is more strongly emphasized (also versus the un-normalized ion image), and its presence in the cerebellar nucleus is more evenly spread. The same is also true form z 18416, which shows up in the central white ventricle area and in the elongated corpus callosum that touches it at the top.

CONCLUSION

This document introduced a novel normalization method for use in standard mass spectrometry as well as mass spectral imaging. The ionization efficiency correction method comes closer to the goal of using ionization efficiency for normalization purposes than the current industry standard based on total ion current. The reason for its improved performance lies in its ability to discern in the mass spectra common peak patterns from differential peak patterns, and to adjust its scaling factors accordingly.

IEC does this by fusing the chemistry and physics considerations towards normalization with the mathematical concepts of matrix decomposition. It is in this unique fusion of approaches that the novelty of the method lays. IEC provides both a general framework for normalization and a concrete implementation of that framework using non-negative matrix factorization. Further development will particularly focus on improving the rank-1 approximation engine of the IEC framework, and to reduce its computational requirements.

Other embodiments of the invention will be apparent to those skilled in the art from consideration of the specification and practice of the invention disclosed herein.

For instance although originally designed for processing of mass spectral data, the IEC method described here can be applied to any method generating a "chromatographic" style output (a collection of peaks distributed across a x/y scale, were the peak heights are proportional to the concentration/abundance/intensity of the measured event). Obvious examples are liquid chromatography (LC), gas chromatography (GC) and densitometric scans.

It is intended that the specification and examples be considered as exemplary only.

Each and every claim is incorporated into the specification as an embodiment of the present invention. Thus, the claims are part of the description and are a further description and are in addition to the preferred embodiments of the present invention.

Each of the claims set out a particular embodiment of the invention.

DRAWING DESCRIPTION

Brief Description of the Drawings

The present invention will become more fully understood from the detailed description given herein below and the accompanying drawings which are given by way of illustration only, and thus are not limitative of the present invention, and wherein:

FIG. 1.1. is a graphic that provides an example of normalization, (a) Before ion intensity normalization is applied, the peak heights differ substantially between both spectra, (b) After normalization, the spectra are put on the same intensity scale, enabling direct comparison of peak height.

FIG. 1.2. is a schematic diagram showing Rank-1 approximation of a matrix. A rank-1 approximation attempts to decompose the matrix into a single product of vectors, while potentially optimizing additional constraints. In the case of IEC, the matrix consists of mass spectra and the decomposition produces a common mass spectral profile in one vector (optimized to avoid differential peaks), and a set of scaling factors in the other vector.

FIG. 1.3. is a schematic comparison of TIC-based normalization and IEC normalization. Notice the extra step in IEC, which employs a matrix decomposition method to discern common peak patterns (leading to CIC) from differential peak patterns (leading to DIC) in the mass spectra.

FIG. 1.4. is a graphic providing five content patterns (spectra). These five patterns form the basis for the 25 individual mass spectra that make up the synthetic data set. Notice the common peaks, equal to the base pattern, and the pattern-specific differential peaks added to the second half of the mass range.

FIG. 1.5. is a graphic that displays the common and differential percentages of the total ion currents. The base pattern consists completely of peaks common to all spectra. The additional patterns 1 through 4 contain respectively 64, 61, 55, and 55 percent common ion counts.

FIG. 1.6. is a graphic that provides the noisy data set of 25 spectra. The legend indicates the pattern from which the spectrum stems and with what scaling factor the spectrum was perturbed.

FIG. 1.7. provides an image of an heat map of the spectra with ion intensity noise. The attenuations and amplifications of the rows are clearly visible, and make direct comparison of peak height from one sample to another impossible. The multiplicative noise gives a false sense of variation in quantity. In reality, every peak stems from the same 'amount' of ions in its pattern.

FIG. 1.8. provides an image of an heat map of the spectra without noise. This is the result of reverse scaling using the known noise factors, and can serve as a gold standard for the normalization process.

FIG. 1.9. provides an image of a heat map of the TIC normalized spectra. Notice that samples 1 through 5 are correctly normalized relative to each other. These stem from the base pattern and their TIC is equal to their CIC, explaining why TIC based normalization performs well in these cases. However, samples 6 through 25 show a clear spectrum-wide peak height difference when compared to the first five samples. This striping effect is artificial peak height variation introduced by the TIC-based algorithm, and could be mistaken for genuine biological variation.

FIG. 1.10. provides an image of a heat map of the IEC normalized spectra. Notice the absence of any striping effect, even when comparing spectra with many differential peaks to spectra with little or none. The relative scaling by IEC restores the pre-noise data set well, and the heat map is visually indiscernible from the gold standard heat map. Note that normalization does not necessarily restore the absolute peak height. It is only concerned with relative peak height changes.

FIG. 1.11. is a graphic that provides a zoomed-in look at the normalization of the mass spectrum from sample 6. The TIC-based normalization (green) clearly underestimates, while the IEC (red) is almost perfectly matched with the gold standard (blue). Only at the very tips does the gold standard become visible.

FIG. 1.12. provides an image of an heat map of the spectra with ion intensity noise in the presence of Gaussian additive noise FIG. 1.13. provides an image of a heat map of the TIC normalized spectra in the presence of Gaussian additive noise. Notice the bad scaling of sample 12. This is the result of low ion intensity values being swamped by the additive noise. The TIC-based method is not able to discern peaks produced by the additive noise from real common low abundance peaks. The additive noise peaks are in the same relative intensity range as the real ion peaks, and contribute almost as much to the TIC as real peaks. As a result, the amount of TIC is overestimated (a large part of it being noise), which leads to an underscaling of the spectrum. FIG. 1.14. provides an image of a heat map of the IEC normalized spectra in the presence of Gaussian additive noise. IEC does a better job than the TIC-based method of bringing the spectrum of sample 12 up to comparable peak heights. Although noise peaks are scaled up as well, it is preferable to have at least the real and common peaks at their correct height. Noise peaks that are scaled upward can always be removed from the analysis later, by removing peaks that only appear in a single sample.

FIG. 1.15. provides an image of a heat map of the un-normalized spectra from the MSI experiment.

FIG. 1.16. provides an image of a heat map of the TIC normalized spectra from the MSI experiment. Notice the increased amount of common peaks pulled from the data.

FIG. 1.17. provides an image of a heat map of the IEC normalized spectra from the MSI experiment. IEC pulls more consistent peaks from the data than the TIC-based method could.

FIG. 1.18. provides pictures with comparison of normalization results for three separate ion images. The ion images of three different ions, m/z 4977, 12181, and 18416 are shown in three situations: normalized, TIC normalized, and IEC normalized. Notice that IEC succeeds in extracting more biologically relevant structure from the data set than the TIC-based method. A version of these images overlaid on a microscopic image of the tissue is available in FIG. 1.19.

FIG. 1.19. provides pictures with comparison of normalization results for three separate ion images, overlayed on a microscopy image of the tissue section to aid biological interpretation. The ion images of three different ions, m/z 4977, 12181, and 18416, are shown for three situations: un-normalized, TIC normalized, and IEC normalized. Particular areas where IEC outperforms the TIC-based method are highlighted with an arrow.

The invention claimed is:

1. An apparatus adapted to separate and quantitatively analyze a test species, the apparatus comprising a mass spectrometer including:
 a detector configured for measuring a test spectrum of said test species, and converting the test spectrum to ion intensity test signals wherein the ion intensity test signals comprise a collection of peaks distributed across a x/y scale;
 a processor adapted to receive said ion intensity test signals from said detector and to process said ion intensity test signals to remove undesirable variation or noise due to variability of the mass spectrometer before further processing the test spectrum,
 wherein the processor is programmed for performing a normalization preprocessing of the ion intensity test signals received from said detector wherein the normalization preprocessing comprises:
  a. Providing a data set comprising a comparative spectrum for each of a plurality of comparative species related to, but different from, said test species;
  b. Identifying a common profile comprising individual peaks that are common to all spectra of the combined data set containing the comparative spectra and the test spectrum;
  c. For each spectrum, calculating its common ion current (CIC) as a sum of only those ion counts belonging to the part of the spectrum that corresponds to the common profile;
  d. For each spectrum, scale back the entire spectrum, including portions not found in the common profile, with the inverse of its CIC or with a CIC-derived scaling factor in order to remove ion intensity noise and generate for each spectrum a CIC normalized spectrum having comparable peak intensities.

2. The apparatus according to claim 1, wherein the normalization preprocessing comprises
 e. Generating a mass spectral image comprising a plurality of spatial locations or pixels configured as a graphical representation of peak height and/or peak area for each CIC normalized spectrum, said plurality of pixels corresponding to an image of the test species and representing comparable peak intensities from one location or pixel to another.

3. The apparatus according to claim 1, wherein the processor is programmed for a normalization preprocessing of the signals of said apparatus, wherein the normalization process is without a total ion current (TIC)—based normalization step to assure that ionization efficiencies are compared and rectified on the basis of the common profile and not on the basis of the parts that are not common between the spectrum and the common profile.

4. The apparatus according to claim 1, wherein the normalization is an ionization efficiency correction.

5. The apparatus according to claim 1, wherein the processor is adapted for processing the signals into information that demonstrates relative current produced by ions in relation to varying mass/charge ratios.

6. The apparatus according to claim 1, wherein the detector comprises an electronic detection means for ion detection and further comprises a means for desorption or vaporization, an ionization means and an ion acceleration means with ion separation or deflection means to separate ions, for instance according to their mass and charge.

7. The apparatus according to claim 1, wherein the detector comprises: 1) an ion source for ionizing a specimen to generate ions; 2) an ion sorting means, the so called mass or ion mobility analyzer, responsible for sorting and separating ions according to their mass and charge or their mobility, which comprises an ion transport portion for transporting the ions with a mass or mobility selection and/or analyzing means for computation of the m/z or mobility ratios based on the detailed motion of the ions passing through the field; and 3) an ion detector for recording either charge induced or current produced when an ion passes by or hits a surface.

8. The apparatus according to claim 1, with a display means to display relative abundance or intensity of ion with a specific mass-to-charge ratio (m/z) in peaks on a graphic.

9. The apparatus according to claim 1, wherein the common profile is determined by a decomposition algorithm that extracts from the data set a plurality of common ion peaks and relative peak heights and/or relative peak areas.

10. The apparatus according to claim 1, wherein the combined data set comprises N spectra that each contain M m/z bins, and the normalization preprocessing further comprises:
 identifying a rank-1 approximation of the two-mode array or matrix containing all the spectra by organizing a rank-1 approximation of the N×M data matrix, while penalizing differential peaks in the profile vector,
  wherein the common profile is generated as a 1×M vector containing the common spectral profile and a N×1 vector containing scaling factors; and
 utilizing the scaling factor as an estimate for the common ion current (CIC) for each spectrum.

11. The apparatus according to claim 10, wherein the rank-1 approximation is identified by running a non-negative matrix factorization (NMF) algorithm on the combined data set in rank-1 mode multiple times, wherein the differential residuals are deducted from the data set in each iteration.

12. A method of diagnosing of a disorder or biological abnormality, wherein the method comprises processing of a plurality of variables obtainable from assaying of spectroscopic images or profiles of a test species obtained from a patient, wherein the method comprises normalization preprocessing of signals obtained from a mass spectrometer wherein the signals comprise a collection of peaks distributed across a x/y scale, wherein the normalization preprocessing comprises the steps of:
 a. Providing a data set comprising a comparative spectrum for each of a plurality of comparative species related to, but different from, said test species;
 b. Identifying a common profile comprising individual peaks that are common to all spectra of the combined data set containing the comparative spectra and the test spectrum;
 c. For each spectrum, calculating its common ion current (CIC) as a sum of only those spectroscopic counts belonging to the part of the spectrum that corresponds to the common profile;
 d. For each spectrum, scale back the entire spectrum, including portions not found in the common profile, with the inverse of its CIC or with a CIC-derived scaling factor.

13. The method according to claim 12, wherein the normalization preprocessing comprises:
 e. Generating a mass spectral image comprising a plurality of spatial locations or pixels configured as a graphical representation of peak height and/or peak area for each CIC normalized spectrum said plurality of pixels corresponding to an image of the test species and representing comparable peak intensities from one location or pixel to another.

14. An operating system for operating the method according to claim 12 which controls the allocation of an assay system to generate biomarker values of a patient and which feeds the input signals from the assay system into a signal processor comprising a mathematical model that is described on the relationship of a plurality of biomarker variables and a plurality of disorder variables from assaying of biological samples of a plurality of patients with no disorder, affected with disorder, affected with a defined seriousness or with defined progress of disorder.

15. The operating system according to claim 14 for determining the presence or absence of disorder, the seriousness of disorder or the progress of disorder in the patient.

16. The operating system according to claim 14, wherein the operating system includes a user interface to enable the user to interact with the functionality of the computer.

17. The operating system according to claim 14, wherein the operating system includes a graphical user interface whereby the operating system controls the ability to generate graphics on the computer's display device that can be displayed in a variety of manners representative for or associated with the condition of disorder in a selected patient or a group of patients to allow a user to distinguish between the absence of disorder, the seriousness of disorder or the progress of disorder in identified patients or patient groups.

18. A mass-spectrometer implemented method for producing a normalized mass spectrum, comprising the steps of:
generating, with an ion source and a detector, a plurality of test spectra by ionizing a test species, and converting the test spectra to ion intensity test signals wherein the ion intensity test signals comprise a collection of peaks distributed across a x/y scale;
comparing, with a processor on a peak-by-peak basis, each peak of each of the plurality of test spectra to produce a common profile comprising individual peaks that are common to all spectra of the plurality of test spectra;
generating, with a processor, for each of the plurality of test spectra a normalized spectrum by scaling back each of the plurality of test spectra with the inverse of the sum of those ion counts belonging to the test spectrum that correspond to the common profile or with a factor derived from the inverse of the sum of those ion counts belonging to a part of the test spectrum that correspond to the common profile.

19. The mass-spectrometer implemented method according to claim 18, wherein, for each of a resulting plurality of normalized spectra, storing a false color representation of peak height and/or peak area as a pixel corresponding to an image of the test species.

* * * * *